US009230266B2

(12) United States Patent
Bentley

(10) Patent No.: US 9,230,266 B2
(45) Date of Patent: Jan. 5, 2016

(54) SYSTEMS AND METHODS FOR GENERATING CUSTOMIZED ADVERTISEMENTS

(71) Applicant: Bentley Group LLC, West Point, UT (US)

(72) Inventor: Jordan Michael Bentley, West Point, UT (US)

(73) Assignee: ADAMATIC INC., Salt Lake City, UT (US)

( * ) Notice: Subject to any disclaimer, the term of this patent is extended or adjusted under 35 U.S.C. 154(b) by 0 days.

(21) Appl. No.: 14/061,607

(22) Filed: Oct. 23, 2013

(65) Prior Publication Data

US 2014/0114758 A1    Apr. 24, 2014

Related U.S. Application Data

(60) Provisional application No. 61/858,510, filed on Jul. 25, 2013, provisional application No. 61/778,032, filed on Mar. 12, 2013, provisional application No. 61/717,284, filed on Oct. 23, 2012.

(51) Int. Cl.
*G06Q 30/00* (2012.01)
*G06Q 30/02* (2012.01)

(52) U.S. Cl.
CPC ........ *G06Q 30/0255* (2013.01); *G06Q 30/0254* (2013.01)

(58) Field of Classification Search
CPC  G06Q 30/0255; G06Q 30/0254; G06Q 30/02
USPC .......................................... 705/14.53, 14.66
See application file for complete search history.

(56) References Cited

U.S. PATENT DOCUMENTS

| | | | |
|---|---|---|---|
| 6,098,065 A * | 8/2000 | Skillen et al. ................. | 707/722 |
| 6,334,109 B1 | 12/2001 | Kanevsky et al. | |
| 7,483,871 B2 | 1/2009 | Herz | |
| 8,027,874 B2 | 9/2011 | Angles et al. | |
| 8,165,915 B1 | 4/2012 | Lucash | |
| 8,401,897 B1 | 3/2013 | Chatterjee | |
| 2002/0013729 A1 | 1/2002 | Kida | |
| 2002/0091568 A1 | 7/2002 | Kraft et al. | |
| 2002/0194062 A1 | 12/2002 | Linde | |
| 2003/0083937 A1 * | 5/2003 | Hasegawa et al. .............. | 705/14 |
| 2003/0101454 A1 | 5/2003 | Ozer et al. | |
| 2006/0074769 A1 | 4/2006 | Looney et al. | |
| 2007/0112762 A1 | 5/2007 | Brubaker | |
| 2007/0184820 A1 | 8/2007 | Marshall | |
| 2007/0204301 A1 | 8/2007 | Benson | |
| 2008/0040216 A1 | 2/2008 | Dellovo | |

(Continued)

*Primary Examiner* — John G Weiss
*Assistant Examiner* — Seyed Farid Kazemi Bejestani
(74) *Attorney, Agent, or Firm* — R. Whitney Johnson; Stoel Rives LLP

(57) ABSTRACT

Systems and methods for generating customized electronic advertisements are disclosed. A request for an advertisement is received. Viewer data is received and analyzed to determine current viewer features, characteristics, attributes, and/or interest(s). Product data can be extracted from publicly accessible electronic data generated by an ad source organization. The product data can be compared to the current viewer interest(s) to determine which product of the plurality of products most closely aligns with the current interests of the viewer to select a product to be advertised. A customized advertisement can be generated specifically for the viewer using at least a portion of the extracted product data for the product to be advertised.

20 Claims, 14 Drawing Sheets

(56) References Cited

U.S. PATENT DOCUMENTS

| | | |
|---|---|---|
| 2008/0201220 A1 | 8/2008 | Broder et al. |
| 2008/0270359 A1* | 10/2008 | Madhavan et al. ............ 707/3 |
| 2008/0281677 A1 | 11/2008 | Toms et al. |
| 2009/0089148 A1 | 4/2009 | Gujjar et al. |
| 2009/0210270 A1 | 8/2009 | Quan et al. |
| 2009/0222485 A1* | 9/2009 | Wassmann et al. ....... 707/104.1 |
| 2009/0248494 A1* | 10/2009 | Hueter et al. ................ 705/10 |
| 2010/0023393 A1 | 1/2010 | Costy et al. |
| 2010/0023399 A1 | 1/2010 | Sahni et al. |
| 2011/0060651 A1 | 3/2011 | Choi |
| 2011/0082735 A1* | 4/2011 | Kannan et al. ............ 705/14.23 |
| 2011/0197220 A1 | 8/2011 | Rowe et al. |
| 2011/0238485 A1 | 9/2011 | Haumont et al. |
| 2013/0030922 A1 | 1/2013 | Shalabi et al. |

\* cited by examiner

FIG. 10

SYSTEMS AND METHODS FOR GENERATING CUSTOMIZED ADVERTISEMENTS

CROSS-REFERENCE TO RELATED APPLICATIONS

This application claims the benefit under 35 U.S.C. §119(e) of U.S. Provisional Patent Application No. 61/717,284, titled SYSTEM AND METHOD FOR AUTOMATIC GENERATION AND CUSTOMIZATION OF INTERNET BASED ADVERTISEMENTS, filed Oct. 23, 2012, of U.S. Provisional Patent Application No. 61/778,032, titled SYSTEMS AND METHODS FOR AUTOMATIC GENERATION AND CUSTOMIZATION OF INTERNET BASED ADVERTISEMENTS, filed Mar. 12, 2013, and of U.S. Provisional Patent Application No. 61/858,510, titled SYSTEMS AND METHODS FOR AUTOMATIC GENERATION AND CUSTOMIZATION OF INTERNET BASED ADVERTISEMENTS, filed Jul. 25, 2013, each of which is hereby incorporated by reference herein in its entirety.

TECHNICAL FIELD

The present disclosure relates generally to generation and customization of advertisements, including but not limited to electronic advertisements such as Internet advertisements that may be presented on a website.

BACKGROUND

The Internet and World Wide Web have provided a new platform for industries to market their products and services (hereafter referred to collectively as "products"). These products may be marketed through various types of internet based advertisements (hereafter referred to as "ads"), which may include text based ads, banner ads, and audio and video ads. These products may also be marketed through other types of electronic advertisements, including advertisements to mobile computing devices (e.g., push ads via mobile aps), to electronic signs, and any electronic device coupled to a network. Typically an ad is general in nature since little is known about the viewer of the ad. Internet search engine websites often provide ads based on search terms (also referred to as keywords), which may allow some level of customization.

Presently available systems and methods may deliver ads based on retargeting, which is limited to presenting a viewer with an ad based on a website or product that the viewer previously viewed. These retargeting ads are generally generic, or static in nature (or limited to a finite set of content), and are not unique to an individual person, such that each person that views that same website or product may see the same ad. In other words, presently available systems provide generic ads, and merely aim to better target these generic ads. Presently available systems and methods simply do not produce ads that are uniquely generated and/or customized for a given viewer.

Presently available systems may also be limited to providing ads from a limited set of ad content that is disconnected or independent from an inventory (e.g., actual products offered for sale) of an ad source organization (e.g., business, company) that is trying to advertise (e.g., market its product, services, event, etc.). For example, an ad source organization may develop ad content and that ad content may, at the time created, be relevant to a product the ad source organization wants to sell. However, the ad source organization may run out of that product, or determine that the price needs to be adjusted. Presently available systems and methods may also be incapable of automatically generating ad content based on the change in inventory or a change to information about a product. In other words, the burden of creating, updating, and transferring the digital ads to the various presently available internet-based marketing companies is solely on the organization trying to advertise its products. Presently available systems simply cannot generate ads that are uniquely generated for a given viewer and customized based on present or even updated information about the product being advertised.

Moreover, presently available systems and methods fail to consider more particular aspects (e.g., location, short term pricing specials, method of sale, etc.) of the ad source organization trying to advertise. For example, several organizations may offer the same or similar products but the ad source organization may offer financing and presently available systems and methods may fail to consider this aspect of the ad source organization.

SUMMARY

The present disclosure provides systems and methods for automatically generating customized ads for a particular viewer, based on viewer data, ad source organization data, and/or website data.

BRIEF DESCRIPTION OF DRAWINGS

Additional aspects and advantages will be apparent from the following detailed description of preferred embodiments, which proceeds with reference to the accompany drawings, in which:

FIG. 10 is an interface for an ad source organization to manage preferences of an ad campaign, according to one embodiment.

DETAILED DESCRIPTION

Figure 1:
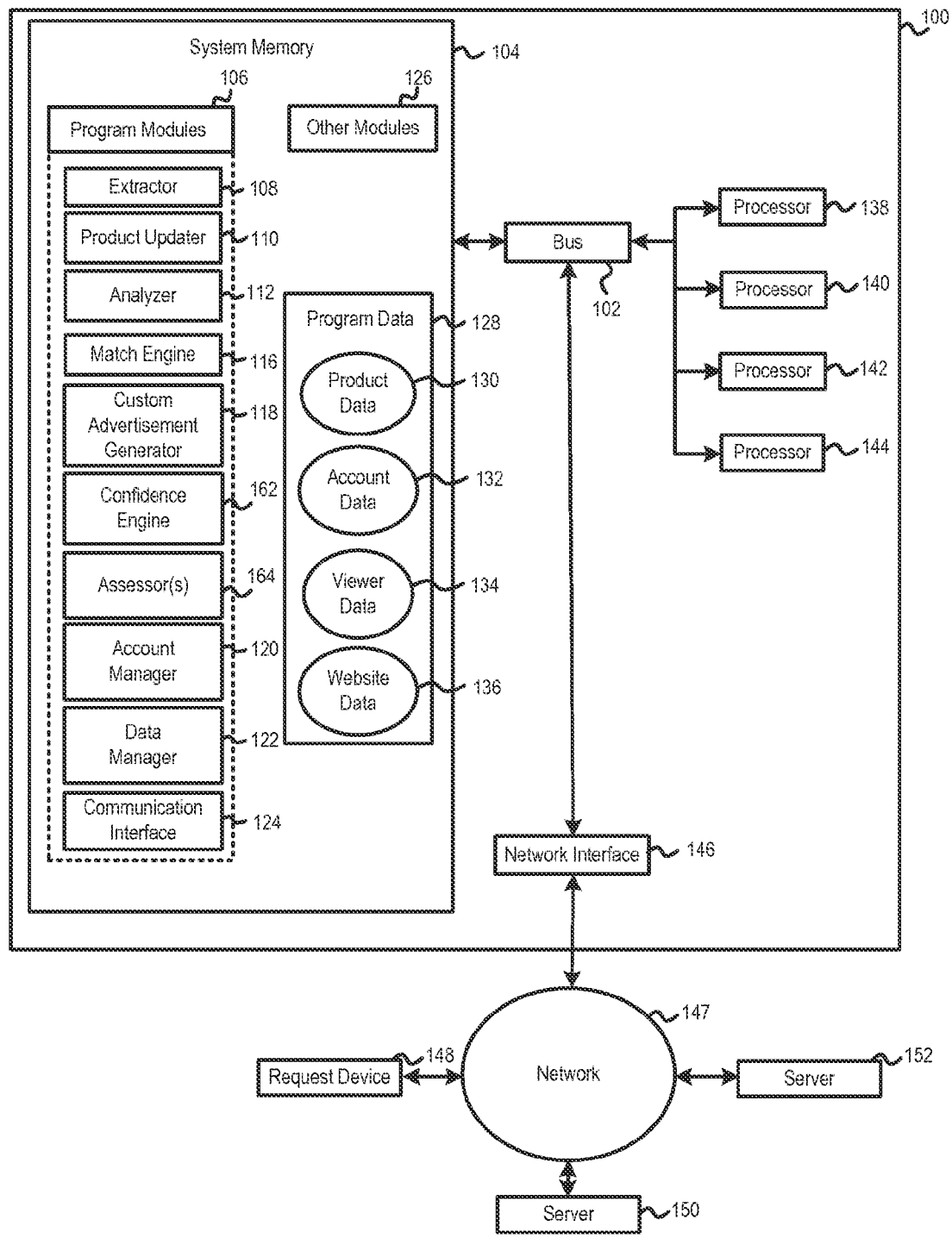
FIG. 1 is a system for automatically generating customized ads, according to one embodiment.

The present disclosure will be better understood from the detailed description provided below and from the drawings of various embodiments, methods, and examples herein. These specifics, however, are provided for explanatory purposes that help the various embodiments of the disclosure to be better understood. The invention should therefore not be limited by the described embodiments, methods, and examples, but by all embodiments and methods within the scope and spirit of the invention as claimed.

The present disclosure provides systems and methods for automatically generating customized ads for a particular viewer, based on viewer data, ad source organization data, and/or website data. The systems and methods of the present disclosure may generate ads that are created specifically for a given viewer, for a location the ad will be displayed, and/or for marketing aspects of the ad source organization and/or product that align with present interests of the viewer.

The term "viewer" as used herein includes, and is not limited to, the person or persons using an electronic device to access the Internet and that will see or be presented (or otherwise be subject to) the ad, whether though visual, audio, or other means. The term "viewer data" as used herein includes, and is not limited to, browsing history including the time history such as the time spent on a given website, search queries, ad interactions (including a lack of interaction, e.g., not clicking on an ad), online profiles, and other data generated by the viewer. The term "display website" as used herein includes, and is not limited to, the website or web source which may include online blogs, videos, and other outlets where the viewer will be presented (or otherwise subject to) an ad whether though visual, audio, or other means. The term "display website data" as used herein includes, and is not limited to, data associated with the display website including content, whether text, image, or video, and other website related data such as website structure, color schemes, font types and sizes. The term "website data" as used herein includes, and is not limited to, display website data and similar data of other websites, including the ad source organization website and third-party websites and may further include data pertaining to the content of websites. The term "ad source organization" as used herein includes, and is not limited to, a business, a company, or other entity or organization trying to market or advertise products, services, events, etc. The term "ad source organization website" as used herein includes, and is not limited to, a website or web source where an ad source organization publishes information (e.g., as publicly accessible electronic data) with regard to product(s) that the ad source organization offers (e.g., sells, rents, leases, presents, provides), which may include details such as descriptions, specifications, pricing information, ratings, etc. The term "product" as used herein includes, and is not limited to, a product, a service, an event, or any other item that an ad source organization offers and/or markets, such as through advertising. The term "ad source organization data" as used herein includes, and is not limited to, data associated with the ad source organization including advertising campaign data, ad source website data (e.g., ad source organization location data, product data), and any other data related to the organization and its offering.

FIG. 1 is a system 100 for automatically generating customized ads, according to one embodiment. The system 100 may generate customized ads based on viewer data, ad source organization data, and/or website data. The system 100 may include a bus 102, system memory 104, one or more processors 138, 140, 142, 144 and a network interface 146. The system memory 104 may include a plurality of program modules 106. The program modules 106 may include all or portions of other elements of the system 100. The program modules 106 may run multiple operations concurrently or in parallel on the one or more processors 138, 140, 142, 144. The system memory 104 may also include other modules 126, such as an image processing module, translation module, or the like, which may be internal to the system 100 as shown, or which may enable incorporation of external functions.

The system memory may also include stored program data 128. Data generated by the system 100, such as by the program modules 106 or other modules 126, may be stored on the system memory 104, for example, as stored program data 128. The stored program data 128 may include product data 130, account data 132, viewer data 134, and website data 136. The data may be organized in the program data 128 as one or more databases, such as a product database, an account database, a viewer database, and a website database.

The system 100 may also include various elements or components to implement functionalities of the system, including an extractor 108, a product updater 110, an analyzer 112, a match engine 116, a custom advertisement ("ad") generator 118, a confidence engine 162, one or more assessors 164, an account manager 120, a data manager 122, and a communication interface 124. These elements may be embodied, for example, at least partially in the program modules 106. In other embodiments, these elements may be embodied or otherwise implemented in hardware of the system 100.

The extractor 108 may be configured to extract information from publicly accessible electronic data, including publicly accessible electronic data generated by an ad source organization. For example, the extractor 108 may call (e.g., visit) a website, such as an ad source organization website, to extract information. As another example, the extractor 108 may monitor a rich site summary (RSS) feed or similar live presentation of electronic data and extract information. As still another example, the extractor 108 may monitor a social media website and/or platform (e.g., Facebook®, Twitter®, and the like) to extract information. The extractor 108 may be configured to automatically extract information and/or product data, without user intervention. Automation of the extractor 108 extracting information may occur based on a timer, a time of day, in response to a server request, or any of a number of techniques for automating extraction to occur without user intervention.

The extracted information may include product data pertaining to a product or products being offered by the ad source organization. As indicated above, a product may be a service. The ad source organization may be offering the product(s) in any of various ways, such as offering for sale, lease, or rent, presenting (e.g., an event), or otherwise providing the product. The product data may include, but is not limited to, a product description, product specifications (e.g., size, weight, color, model, etc.), product rating(s), pricing of the product, location of the product, and product images.

In instances where portions or details of product data may not be present in publicly accessible electronic data generated by the ad source organization, the extractor 108 may extract such missing portions or details or additional product data from other publicly accessible electronic data, for example, as may be generated by other organizations, such as a manufacturer of the product, other vendors of the product, etc.

The extractor 108 may also be configured to extract other data relating to the ad source organization including but not limited to physical store locations, hours of operation, financing options, and current specials offered by the ad source organization. The extractor 108 may also be configured to extract website data of a website of the ad source organization. The website data may include, for example, website colors, font sizes, and layout.

The extracted information may be stored in system memory 104. The information may be stored only temporarily. For example, the extracted information may be stored in the program data 128. The extracted information may include product data 130 that may be stored in the program data 128 and other extracted data relating to the ad source organization that may be stored separately, for example, as account data 132.

The product updater 110 may be configured to identify any changes to the publicly accessible electronic information generated by an ad source organization, and particularly product data, for products offered by an ad source organization. Changes to product data may include addition or removal (deletion) of product information (including adding new products or removing products), changes to the price of a product, updated ranking information, or any other changes to any product details. The product updater 110 may automatically identify and extract changes of the publicly accessible electronic information of the ad source organization, without user intervention. Other changes to the publicly accessible electronic information may include discount pricing information for one or more products and limited-time promotional information for one or more products.

The analyzer 112 may be configured to analyze (and/or process) various sources of data that may be used in generating customized ads. The data that may be analyzed by the analyzer 112 may include, but is not limited to, ad request data (received with a request for an ad), product data 130, account data 132, viewer data 134, and website data 136.

The analyzer 112 may analyze product data 130 extracted by the extractor 108 to determine features, characteristics, and/or attributes of products offered by the ad source organization. For example, the analyzer 112 may determine such product features, characteristics, and/or attributes as product type, pricing, color, location, product rating, product image, size, weight, and the like. If the product is an automobile, the analyzer may determine such features, characteristics, and/or attributes as body type, make, model, mileage, and the like. The analyzer 112 may generate a representation for each product (e.g., representing features, characteristics, and/or attributes of the product), such as a data structure or a mathematical model. For example, the analyzer 112 may generate a product feature vector for each product.

The analyzer 112 may analyze viewer data 134 to determine various features, characteristics, and/or attributes of the viewer, which may include current viewer interests (or potential current viewer interests). In analyzing the viewer data and/or generating a viewer feature vector, the analyzer 112, may consider previous products that the viewer did and did not view, search terms, data entered into a form, etc. The analyzer 112 may generate a representation of the viewer (e.g., representing features, characteristics, and/or attributes of the viewer), such as a data structure or a mathematical model. For example, the analyzer may generate a viewer feature vector to which product feature vectors may be compared for determining products that may be a match to the viewer and/or that may be of interest to the viewer.

The analyzer 112 may analyze ad request data to determine ad specifications, such as a dimensions or size (space available) for the ad, and acceptable ad formats (e.g., jpg, swf, mp3 and mp4).

The analyzer 112 may analyze website data 136 to determine display website formatting, fonts, styles, and the like, for use in generating a customized ad that is compatible with the display website. The analyzer 112 may also analyze other website data 136 (e.g., website data of websites previously visited by viewers), for example, to assess viewer interests.

The analyzer 112 may analyze account data 132 of a given ad source organization for use in determining stipulations and/or preferences for customized ads generated for the ad source organization. The analyzer 112 may, for example, generate a weighting of various product features or generate rules based on the account data. The analyzer 112 is discussed in greater detail below with reference to FIG. 5.

The match engine 116 may be configured to determine relevant product(s) for a given viewer, such as the most relevant product(s) of a set of products (e.g., the products offered by one or more ad source organizations). More specifically, the match engine 116 may be configured to compare analyzed product data for products of one or more ad source organizations against analyzed viewer data for a viewer to whom a custom generated ad would be presented. This comparison may be done in several ways. In one embodiment, the match engine 116 may employ machine learning techniques, including supervised and unsupervised. In one embodiment, the match engine 116 may use a deterministic approach, such as comparing product feature vectors to a viewer feature vector of the targeted viewer. The comparison of a product feature vector to a viewer feature vector may include quantifying a distance between these vectors using mathematical norms (e.g., Euclidean norm, Taxicab norm, etc.). Furthermore, weight vectors may be utilized to emphasize a feature or set of features (or characteristics or attributes) of a viewer as derived from analyzed viewer data. The match engine 116 may search analyzed product data (e.g., product feature vectors) and identify which product(s), if any, match (or are most relevant to) a given viewer. The match engine 116, according to one embodiment, may utilize or otherwise perform a process of identifying a matching product, such as the process described below with reference to FIG. 6 or the process described below with reference to, and diagrammatically represented in, FIG. 7.

The confidence engine 162 may be configured to determine a confidence score (e.g., a confidence level value) representing a level of confidence that a viewer will have interest in an ad. More specifically, the confidence engine 162 may determine an objective measure (e.g., a confidence score) representing a likelihood of success of an ad and/or a likelihood that the viewer will be interested in a custom generated ad for the matching product (as identified by the match engine 116). The confidence engine 162 may determine a confidence score based on several variables, including but not limited to, a distance (or closeness or relative similarity) between the matched product and an ideal (or closely ideal) product, how well a product matches the features, characteristics, attributes, and/or identified interest(s) of the viewer, and/or the advertisements and/or products for which the viewer has previously demonstrated interest. The confidence engine 162 may utilize additional data if available (such as click through data associated with previous ads), but this is not required. More specifically, the confidence engine 162 does not require training data or historical data to accurately predict a confidence score because detailed knowledge of a matching product is available through extracted product data. Computing a confidence score is discussed more fully below with reference to FIG. 4.

The custom ad generator 118 may be configured to automatically generate custom ads. The custom ad generator 118 may generate a custom ad based on request data for a given request, viewer data and/or current viewer interest(s), website data, extracted product data, and/or ad source organization data and/or other data. The custom ad generator 118 may select or otherwise determine an ad canvas, generate and/or select custom content components, and incorporate or add custom content components to the ad canvas to synthesize a custom ad. The custom ad generator 118, according to one embodiment, may utilize or otherwise perform a process of generating a customized ad, such as the process described below with reference to FIG. 8, which may include running the one or more assessors 164 and/or utilizing output of the one or more assessors 164. The custom ad generator 118 may determine which and how many assessor outputs (e.g., custom content components) to incorporate in synthesizing a custom ad.

The one or more assessors 164 may each be configured to assess analyzed viewer data (such as a viewer feature vector) and, based on viewer data and/or current interest(s) of a viewer, provide custom content that is customized for the viewer. The custom content may be used by the custom ad generator 118. The assessors 164, according to one embodiment, may compute or utilize previously computed results of various mathematical and statistical measures (e.g., standard deviation, mean, maximum and minimum values, slope, and inflection points) of the viewer data and compare one or more viewer feature vectors of the viewer with the product feature vector for a matched product. This comparison may include comparing individual features such as the price and/or may include comparing several features such as brand names where each brand is represented as one feature. The assessors 164 may then generate custom content. The custom content may be a form of electronic media, including but not limited to text, image(s), audio, and video. The assessors 164 may further compute a weighting associated with the custom content. The weighting may be used by the custom ad generator 118 in determining which custom content to incorporate into a customized ad. A process of an assessor 164, according to one embodiment, is described below with reference to FIG. 9.

The account manager 120 may be configured to maintain and store account details that may be pertinent to an ad source organization and/or an advertising campaign of the ad source organization. The account details may include account status, advertisement campaign settings (e.g., spending or display thresholds), campaign focuses, promotions, and any other account information.

The data manager 122 may be configured to maintain and store data, including extracted information (e.g., product data), other data relating to the ad source organization, ad request data, viewer data, website data, product data, and account data. The data manager 122 may implement, administer, maintain and/or update stores of data, such as stores of product data 130, account data 132, viewer data 134, and website data 136. In one embodiment, the stored data 130, 132, 134, and 136 may be stored in one or more databases.

The communication module 124 may be configured to receive ad requests and send the associated response. Specifically, the communication module 124 may receive a request for an advertisement from a content server (e.g., a display website) or other electronic device, and may transmit back to the requesting device a customized ad generated by the custom ad generator 118.

As noted above, data generated by the system 100, such as by the program modules 106, other modules 126, and/or any other elements of the system, may be stored on the system memory 104, such as in the program data 128, which may include product data 130, account data 132, viewer data 134, and website data 136. The program data 128 may be organized into one or more databases, such as a product database, an account database, a viewer database, and a website database. The program data may be may be temporary, may be sparse representations, may be stored on ram, and/or may utilize any of a variety of techniques for efficient, rapid storage and access of data.

The system 100 may be connected to a network 147 through a network interface 146. The system 100 may then contact one or more servers 150, 152, which may host a variety of types of information and a request device 148. The request device 148 may also be a content server (e.g., a website, ad exchange, ad network) that sends a request for an advertisement over the network 147 to the system 100 for automatically generating customized ads. In other embodiments, the request device 148 may be a client computer, a browser, a mobile computing device, a television, or other electronic device. The one or more servers 150, 152, may provide a source (e.g., website, RSS feed, social media) of publicly accessible electronic data generated by an ad source organization or by third-party organizations.

Figure 2:
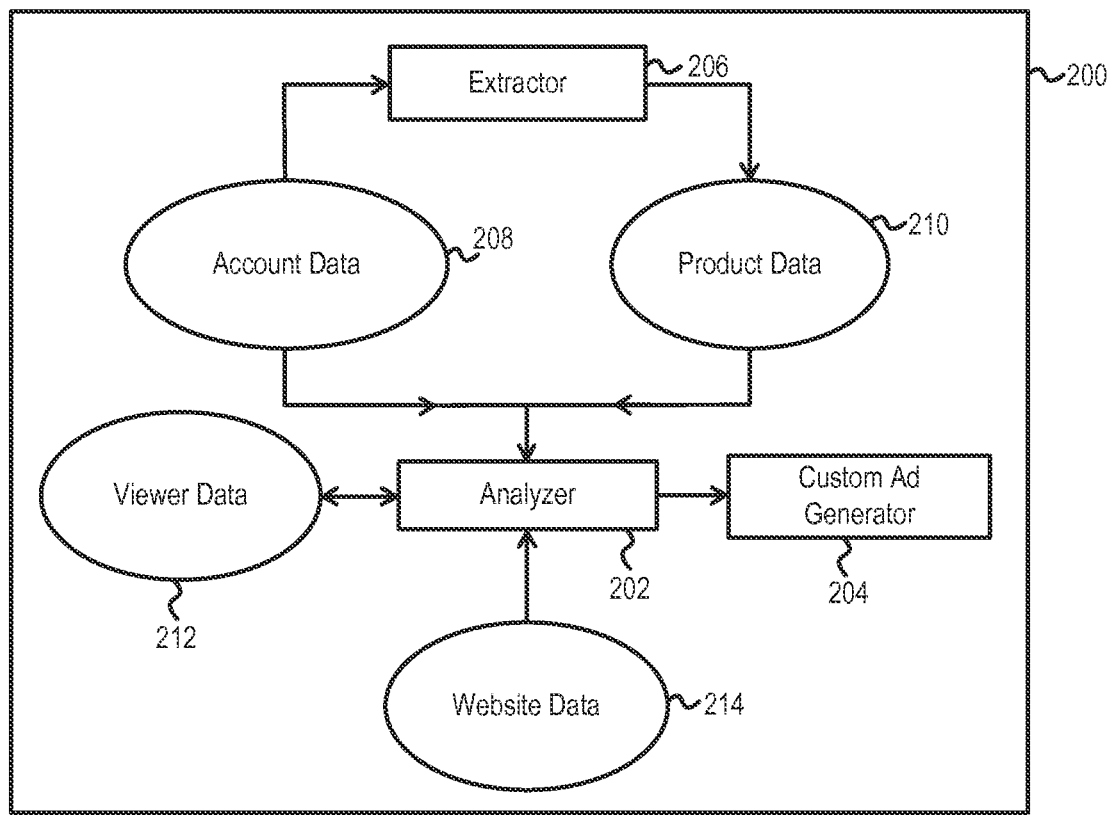
FIG. 2 is a relational diagram of a system for automatically generating customized ads, according to one embodiment.

FIG. 2 is a relational diagram of a system 200 for automatically generating customized ads, according to one embodiment. The system 200 may be similar to the system 100 of FIG. 1 and may generate customized ads based on viewer data, ad source organization data, and/or website data. The system 200 may include an analyzer 202 and a customized custom ad generator 204, which may access various types of data, including but not limited to account data 208, product data 210, viewer data 212, and/or website data 214. The system 200 may also include an extractor 206 which may extract and/or update the product data 210 as well as access and/or update account data 208. The analyzer 202 and the extractor 206 may operate in parallel (e.g., as concurrent processes) to provide inputs to the customized ad generator 204 to generate a customized ad based on the product data 210, account data 208 (and/or other ad source organization data), the viewer data 212, and/or the website data 214.

Figure 3A:
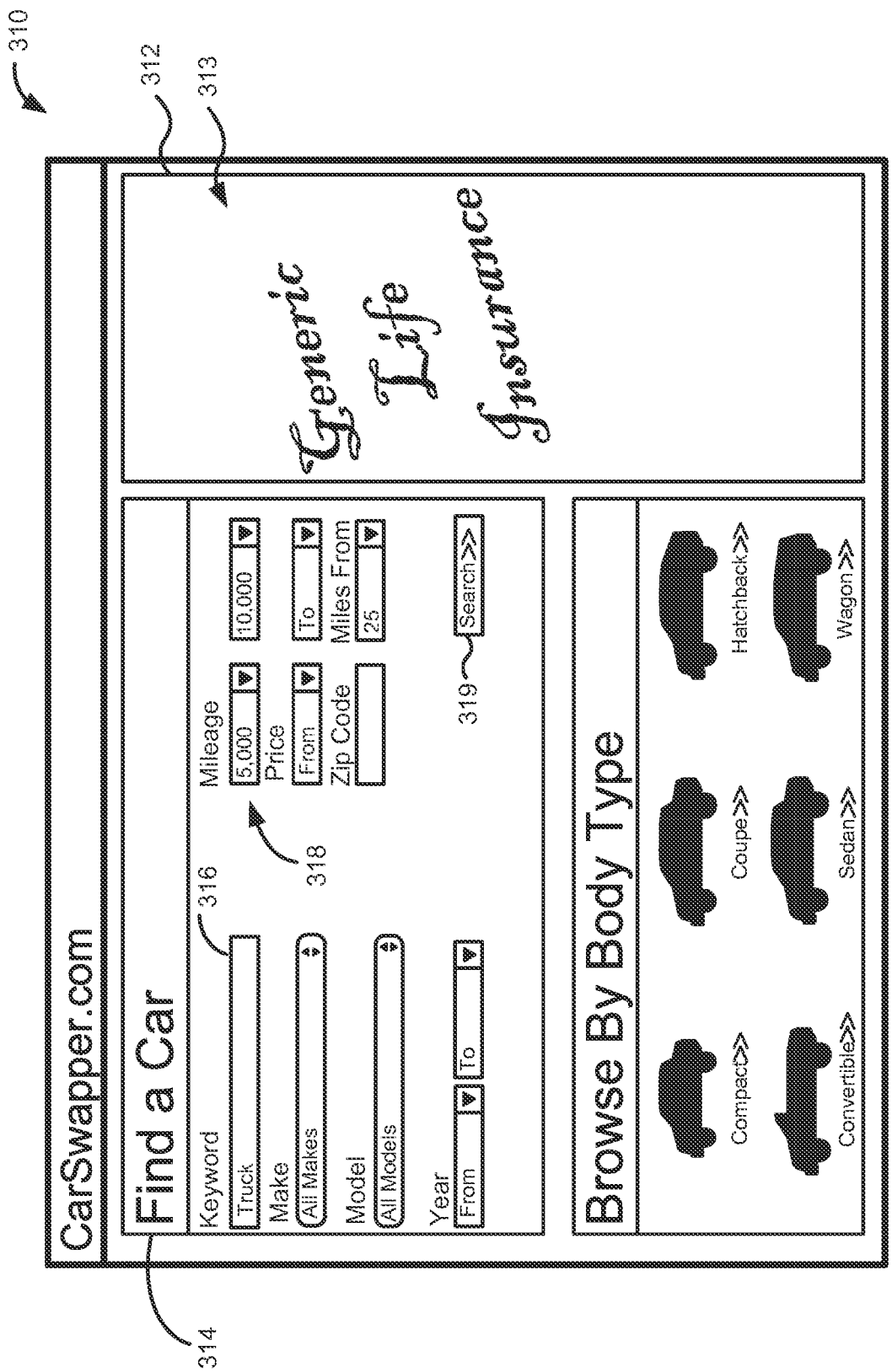
FIGS. 3A, 3B, and 3C provide a high-level illustration of a flow of data during a process for automatically generating customized ads, according to one embodiment.
Figure 3B:
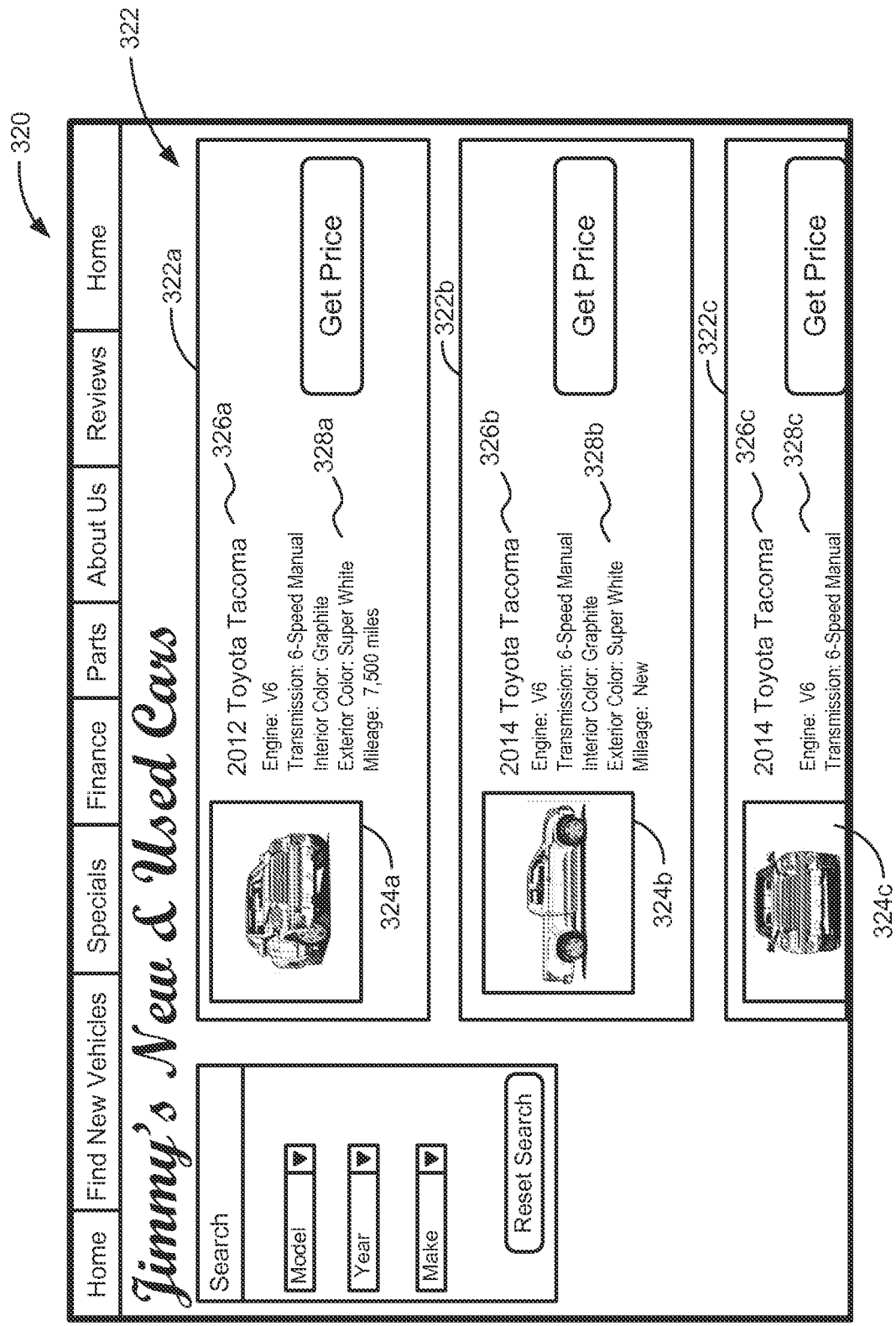
Figure 3C:
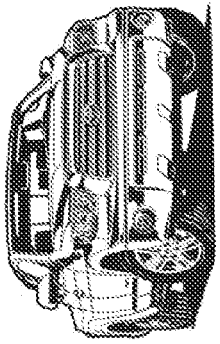

FIGS. 3A, 3B, and 3C provide a high-level illustration of a flow of the various types of data during a process for automatically generating customized ads, according to one embodiment. FIG. 3A illustrates an example of a display website 310, according to one embodiment, that may present listings of cars for sale. The display website 310 may include an advertisement area 312 and a search block 314.

Viewers of the website may be able to search for desired car listings using the search block 314. The search block may include one or more fields to enable a viewer to enter search terms to search for products, which may be cars in the case of the illustrated display website 310. For example, the search block 314 may include a keyword field 316 to receive input providing keywords for the type of product the viewer may be searching to find. The search block 314 may include a mileage field 318 to receive input specifying a desired mileage or range of mileage desired. The search block 314 may include other fields, such as make, model, year, price, and location (e.g., zip code, miles from).

The display website 310 may present ads in the advertisement area 312, for example as a source of revenue. For example, the display website 310 may present ads on a cost per click (cpc) or a cost per impression (cpi) basis and charge an ad source organization accordingly.

A server that serves the display website 310 may obtain ads from a variety of sources. One source of ads may be a system for generating customized ads, such as system 100 as described above with reference to FIG. 1 or system 200 as described above with reference to FIG. 2. The server of the display website 310 may send a request for an ad to the system 100, as will be described.

When a viewer accesses and views this display website 310 for the very first time, little if anything may be known about the viewer. Accordingly, a generic ad 313 may be displayed in the advertisement area 312 of the display website 310. The generic ad may be a default ad. As information is obtained about the viewer, customized ads may be provided by the system for generating customized ads. For example, the viewer of the display website 310 in FIG. 3A may enter the word "truck" as a keyword in the keyword field 316 and may specify a mileage of 5,000 to 10,000 miles in the mileage field 318. This search query may provide information about a current interest of the viewer—e.g., that the viewer is interested in trucks with low mileage in the 5,000 to 10,000 miles range.

When the viewer of the display website 310 clicks on the search button 319 to run the search query, the server of the display website may send a request for a customized ad to the system for generating customized ads, such as the system 100 of FIG. 1 (or the system 200 of FIG. 2). The system 100 is able to analyze viewer data and assess or identify from that viewer data that a current interest of the viewer may be trucks with low mileage and use that identified current interest in generating a customized advertisement, as will be described with reference to FIGS. 3B and 3C.

FIG. 3B illustrates an example of an ad source organization website 320, according to one embodiment. The ad source organization website 320 may present publicly accessible information generated by an ad source organization. The publicly accessible information may pertain to products offered by the ad source organization, which in this case may be automobile dealer that offers automobiles (e.g., cars and trucks) as products. In FIG. 3B, the ad source organization website 320 may provide listings 322 of automobiles offered for sale by the ad source organization. A first listing 322*a* for a truck may include an image 324*a* of the truck, a title of the listing 326*a* describing the truck, and specification information 328*a* providing specifications of the truck. The first listing 322*a* may include a title 326*a* indicating that the first listing 322*a* is for a truck that is a 2012 Toyota® Tacoma® truck. The specification information 328*a* may indicate that the truck has about 7,500 miles.

The second listing 322*b* may also be for a different truck and may include an image 324*b*, a title 326*b*, and specification information 328*b*. Similarly, the third listing 322*c* may be for another truck and may include an image 324*c*, a title 326*c*, and specification information 328*c*. As can be appreciated, the listings 322 may include many more elements of information, but the description here is simplified to an image, title, and specification information for sake of clarity.

The system 100 of FIG. 1 (or the system 200 of FIG. 2) may extract information from the ad source organization website 320, including product data for the products of the listings 322. The extracted product data may be used by the system 100 to generate a customized ad, such as in response to a server request. In the illustrated example of FIGS. 3A-3C, the system may use the extracted product data to generate a customized ad for the viewer of the display website 310 in response to the ad request made or sent as a result of the search query. The system 100 may extract product data and determine there are at least three products offered for sale by the ad source organization, namely the three trucks presented in the listings 322. The analyzer may analyze the received viewer data and the extracted product data and determine which of the products most closely matches an identified current interest of the viewer. In the illustrated example of FIGS. 3A-3C, the system 100 may determine that the truck of the first listing 322*a* may be the closest match and may use product data associated with that truck to generate a customized ad.

FIG. 3C illustrates an example of the display website 310*c*, according to one embodiment, presenting results 350 of the search query of the display website 310*c* and also presenting in the advertisement area 312*c* a customized ad 313*c* that we generated and returned in response to the ad request. The customized ad 313*c* includes product data from the ad source organization website 320 pertaining to the identified matching product of the ad source organization. Specifically, the customized ad 313*c* includes the image 324*a* and the title 326*a* from the listing 322*a* of the truck on the ad source organization website. The customized ad 313*c* may further be customized to highlight a feature of interest to the viewer. In FIG. 3C, the customized ad 313*c* may highlight the "low mileage" of the truck. The customized ad 313*c* may further be customized based on display website data, such as sizing, fonts, colors, etc. Accordingly, FIGS. 3A-3C illustrate an example of the system 100 generating a customized ad based on viewer data, ad source organization data, and/or website data.

In another embodiment, the viewer data may be derived from browsing history rather than from a search query. For example, a viewer may have browsed available listings on the display website and clicked on various listings of interest. Several of the viewed listing may have had similarities, such as listing of trucks with mileage between 5,000 and 10,000 miles, and/or of a particular color (e.g., red). This viewer data and optionally website data may be received and analyzed to derive features, characteristics, and/or attributes of the viewer (e.g., that the viewer has browsed listings of trucks, with mileage between 5,000 and 10,000 miles, and a color red). The system 100 of FIG. 1 may analyze the viewer data and generate a custom ad for a product matching the analyzed viewer data and website data derived from the browsing history. The customized ad that is generated may highlight the interest of the viewer, as derived from the viewer data and website data. Accordingly, viewer data may have various forms, as will be explained in more detail.

Figure 4:
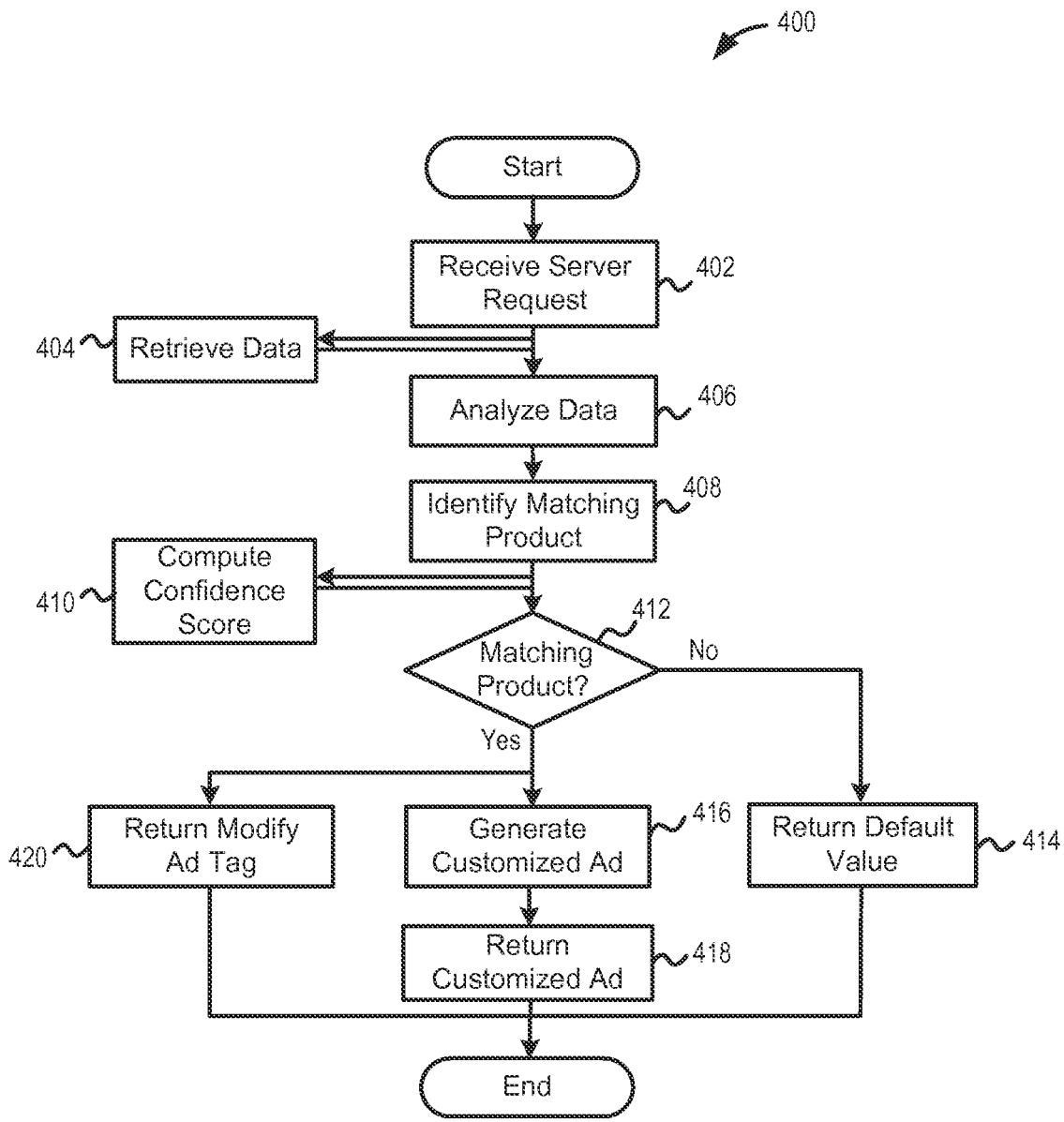
FIG. 4 is a flowchart of a process for automatically generating customized ads, according to one embodiment.

FIG. 4 is a flowchart of a process 400 for automatically generating customized ads, according to one embodiment. The process 400 may generate customized ads based on viewer data, ad source organization data, and/or website data. The process 400 may begin by receiving 402 a request for an ad, for example, from a server or other electronic device. The request may include information such as search parameters, viewer data, website data such as a referring uniform resource locator (url), and ad specifications. Optionally, data may be retrieved 404, including product data, viewer data, website data, and account data. For example, product data may be extracted from publicly accessible electronic data generated by an ad source organization. The process 400 may analyze 406 data (whether retrieved 404 by the process 400 or previously retrieved and stored) to identify relevant data that may be used in generating customized ads. As described above the data analyzed 406 may include but is not limited to ad request data, product data, viewer data, website data, and account data. Analyzing 406 the data may include determining ad specifications, determining display website formatting (including structure, fonts, styles, and the like), and/or determining ad source organization preferences and/or stipulations on customized ads. Analyzing 406 the data may include parsing, filtering, restructuring, and/or otherwise processing viewer data to put it in a form amenable to comparison with product data and parsing, filtering, restructuring, and/or otherwise processing product data to put it in a form amenable to comparison with viewer data. Analyzing viewer data may also include utilizing website data (e.g., the viewer data indicates the websites the viewer may have visited and the website data may provide the content of those websites, which can be used in deriving features, characteristics, and/or attributes of the viewer). Analyzing 406 may include generating viewer feature vectors and generating product feature vectors. Analyzing 406 data is discussed in greater detail below with reference to FIG. 5.

The process 400 may also include identifying 408 a matching product. The matching product may be an ideal (or closely ideal) product that aligns or substantially aligns with a current interest of the viewer. Identifying 408 a matching product may include comparing analyzed viewer data to analyzed product data to identify one or more products within a relative close proximity to an interest a viewer may have. Identifying 408 a matching product is described in more detail below with reference to FIG. 6, and FIG. 7.

As part of or in addition to identifying 408 a matching product, a confidence score may be computed 410. The confidence score may represent a level of confidence that a viewer will have interest in an ad. More specifically, the confidence score may be an objective measure of a likelihood of success of an ad and/or a likelihood that the viewer will be interested in a custom generated ad for a product identified as a match. The confidence score may be computed as a function of several variables, including but not limited to, a distance (or relative similarity) between the matched product and an ideal (or closely ideal) product, how well a product meets the identified interest(s) of the viewer, a measure of the importance of each identified interest(s) (e.g., the viewer may be interested in both price and color and the measure of importance indicate how much the viewer cares about each one, for example relative to each other), and/or the advertisements and/or products for which the viewer has previously demonstrated interest. Additional data may be considered, if available, such as click-through data associated with previous ads, but consideration of this additional data is not required. A confidence score can be accurately computed without data from previous ads because detailed knowledge of a matching product is available through extracted product data and because the analyzed product data can be directly compared to analyzed viewer data.

Traditionally, it is difficult to calculate a confidence measure since little is known about the product being advertised, the advertisement, and the direct relevance of the product (or advertisement) to the viewer. Current methods rely on ad performance data in which they can compare the browsing history of viewers that have clicked on an ad with the browsing history of the viewer of interest. Similarly, other methods include comparing the ad performance data of previously shown ads to the viewer of interest to the proposed ad. While these methods can calculate some probability that the viewer may click on the ad, they are largely based on comparison methods as discussed. As noted, the presently disclosed methods may have detailed knowledge of a features, characteristics, and/or attributes of a product being advertised as well as of features, characteristics, attributes, and/or interests of the viewer, which allow a confidence score to be computed without the need for ad performance data. Although the disclosed approach does not require ad performance data, if available, it may be used.

In one embodiment, a confidence score may be computed as a function of a viewer feature vector, a product feature vector, a normalized standard deviation vector of multiple viewer feature vectors for a given viewer, and a normalized mean vector of multiple viewer feature vectors for a given viewer. For example, a confidence score may be computed using an equation generically stated as the following function:

$$C = f(v_i, p_i, \sigma_{ni}, v_{ni})$$

where $\vec{v}$ is the viewer feature vector, $\vec{p}$ is the product feature vector, $\vec{\sigma n}$ is the normalized standard deviation vector of multiple viewer feature vectors for a given viewer, and $\vec{\mu n}$ is the normalize mean vector of multiple viewer feature vectors for a given viewer. Both the standard deviation and the mean may be normalized using a set of data which may include product feature vector(s) and/or viewer feature vector(s). The following equation may be an example of a function for computing a confidence score:

$$C = \sqrt{\sum_{i=1}^{n} (v_i - p_i)^2} + \frac{\sum_{i=1}^{n} \sigma_{ni}}{\sum_{i=1}^{n} \mu_{ni}}$$

Referring again to FIG. 4, the process 400 may include a determination 412 whether a matching product was identified 408 that has a sufficient computed 410 confidence score. If the determination 412 is that a matching product was not identified 408 and/or an acceptable confidence score was not computed 410, then the system may return 414 a generic ad or default ad or pass the ad request to other servers for fulfillment.

If the determination 412 is that a matching product was identified 408, and optionally if a suitable confidence score computed 410, a custom ad may be generated 416. The ad may be generated using elements of product data presented in a manner amenable to identified current interests of a viewer based on the viewer data. An example of a process of generating a customized ad is described in more detail below with reference to FIG. 8. The customized ad may then be returned 418, generally to the server or other device that provided the ad request.

As an alternative to generating 416 and returning 418 the customized ad, the process 400 may return 420 a modified ad tag. For example, communication with a requesting server may be needed to determine whether an ad may be shown. In interactions with the requesting server such as an ad exchange, the modified ad tag may indicate an intention to buy the impression, which may allow for a quicker response to the server request. The customized ad could then be generated and returned if the impression is ultimately bought.

Figure 5:
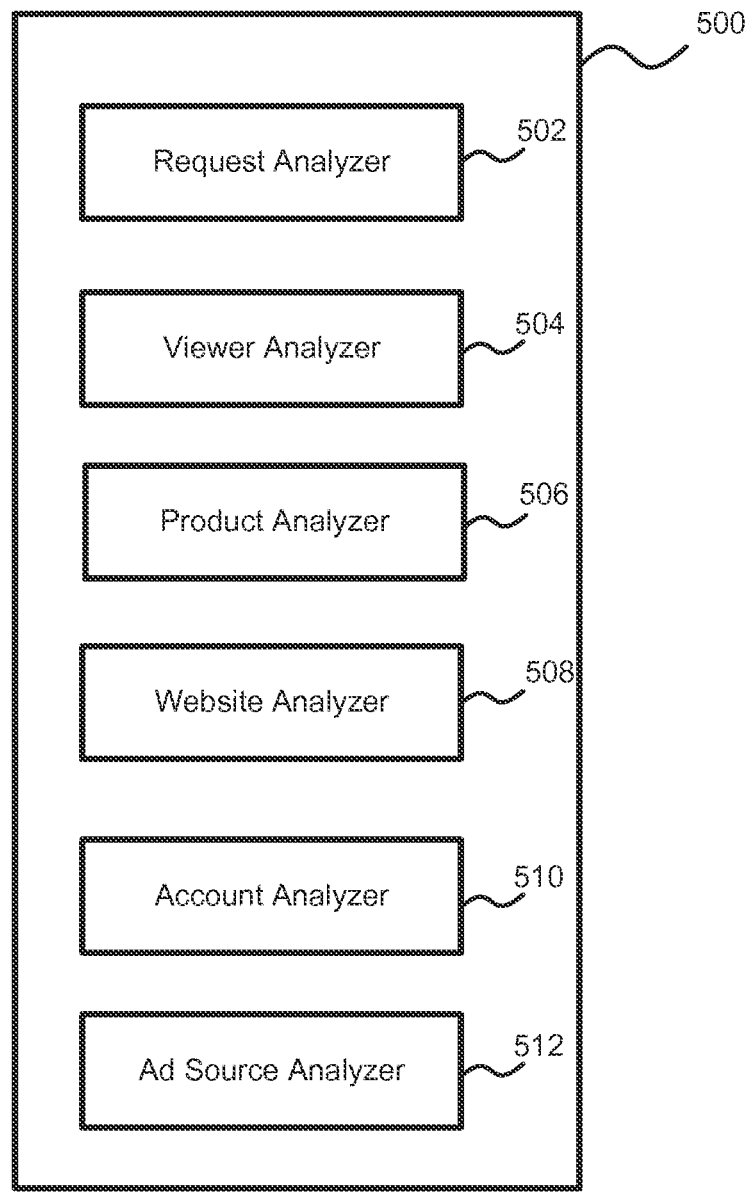
FIG. 5 is an analyzer of a system for automatically generating customized ads, according to one embodiment.

FIG. 5 is an analyzer 500, according to one embodiment, of a system for automatically generating customized ads, such as the system 100 of FIG. 1. As described previously, the analyzer 500 may be configured to analyze data that may include ad request data, viewer data, website data (e.g., display website data, ad source organization website data, third-party website data), product data, and account data. To analyze these various types of data, the analyzer 500 may include several data specific analyzers (e.g., modules), as shown in FIG. 5, to analyze or otherwise process the different specific types of data. For example, the analyzer of FIG. 5 may include a request analyzer 502, a viewer analyzer 504, a website analyzer 506, a product analyzer 508, an account analyzer 510, and an source analyzer 512.

The request analyzer 502 may analyze request data. Analyzing request data may include parsing or otherwise processing request data to determine and/or filter for request attributes. Request data may include, but is not limited to, data contained in the HTTP header fields (e.g., such as a referral URL), and any data supplied with an ad request (e.g., such as ad size, ad placement, etc.). As an example, the request analyzer 502 may parse request data to determine attributes such as required ad specifications from data included with an ad request.

The viewer analyzer 504 may analyze viewer data. Analyzing viewer data may include parsing, filtering, restructuring, or otherwise processing viewer data to determine viewer characteristics and attributes and/or put the viewer data in a format more amenable to comparison with product data. A viewer attribute, according to one embodiment of the present disclosure, may include anything pertaining to a viewer that may be compared against a product attribute such that a relative proximity of the attributes may be measured or quantified. Analyzing viewer data may also include identifying features, characteristics, and/or other aspects pertinent to the viewer. Viewer data may include, but is not limited to, browsing history of the viewer, website view times, a search query generated by the viewer, interactions of the viewer with advertisements (including lack of interaction), an online profile generated by the viewer (e.g., such as on a social media website and/or system, or on a website and/or system of a content server requesting the advertisement), and purchase history of the viewer (including purchases that were not completed or items that have been selected to be purchase but have not competed the checkout process).

The analyzer 500, and particularly a viewer analyzer 504, may analyze viewer data to generate a representation of a given viewer, and more specifically a representation of features, characteristics, and/or attributes of the given viewer. The viewer analyzer 504 may also utilize website data (e.g., the viewer data may indicates websites that the viewer may have visited and the website data may provide the content of those websites, which can be used in deriving features, characteristics, and/or attributes of the viewer). The representation may be a data structure or mathematical model that may be compared to similarly structured data structures or mathematical models. For example, in one embodiment, the analyzer 500 may generate a viewer feature vector. For example, the viewer analyzer 504 may generate an n dimensional viewer feature vector where n is a number of features (or attributes) of the viewer. In another embodiment, the analyzer may generate a plurality of feature vectors for the viewer, such that different feature vectors may be structured for comparison with product data (e.g., product feature vectors) for different types of products.

The product analyzer 506 may analyze extracted product data. Analyzing product data may include parsing, filtering, restructuring, or otherwise processing product data to determine product attributes and/or put the product data in a format more amenable to comparison with viewer data. A product attribute, according to one embodiment of the present disclosure, may include anything pertaining to a product that may be compared against a viewer attribute such that a relative proximity of the attributes may be measured or quantified. Analyzing product data may also include identifying features, characteristics, and/or other aspects of products. The product data may include a product description, product specifications (e.g., size, weight, color, model, etc.), product rating(s), pricing of the product, location of the product, and product images.

Figure 7:
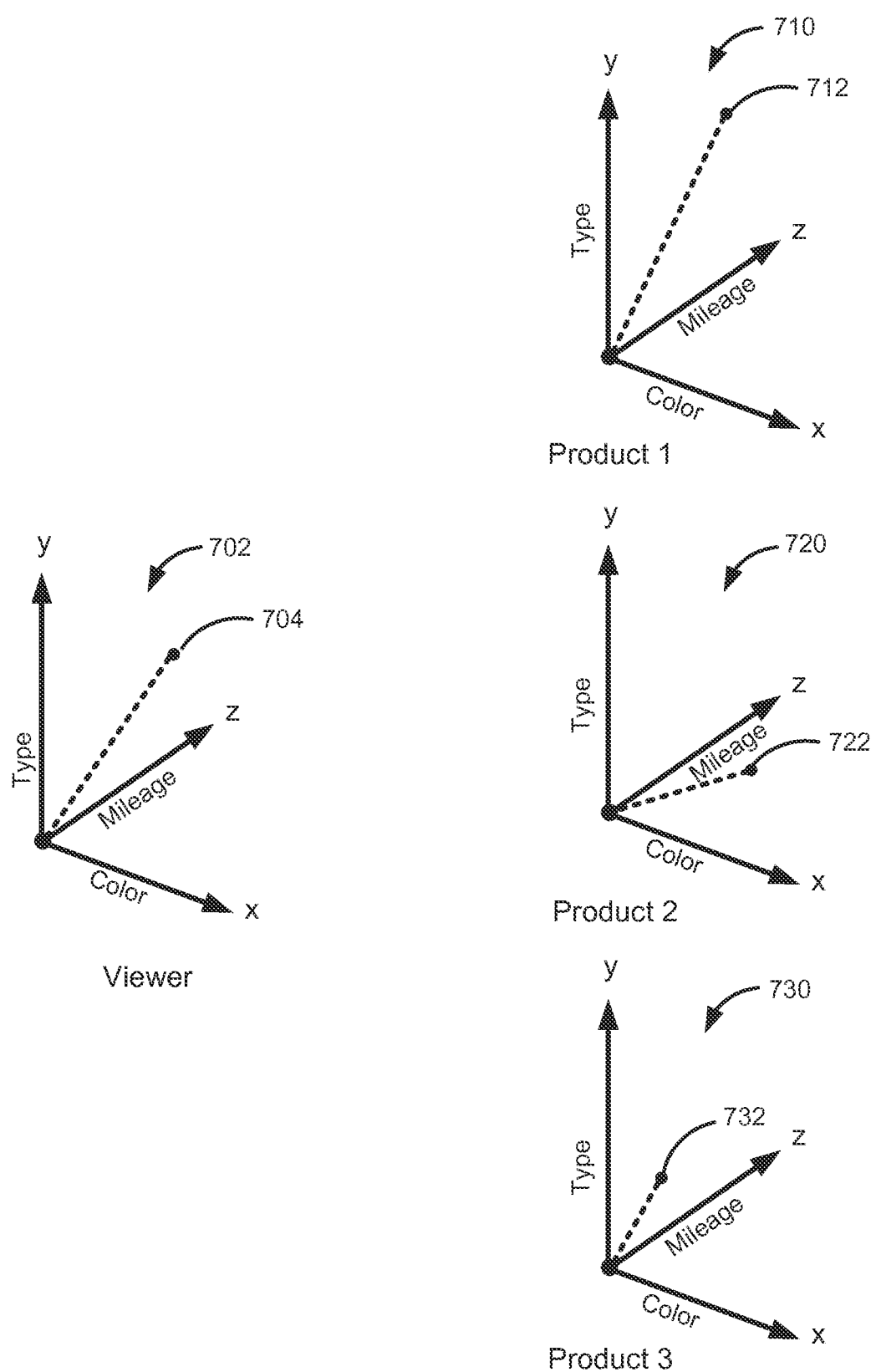
FIG. 7 provides a diagrammatic representation of identifying matching feature vectors, according to one embodiment.

The analyzer 500, and particularly a product analyzer 506, may analyze product data to generate a representation of a given product, and more specifically a representation of features, characteristics, and/or attributes of the given product. The representation may be a data structure or mathematical model that may be compared to similarly structured data structures or mathematical models. For example, in one embodiment, the analyzer 500 may generate a product feature vector. For example, the product analyzer 506 may generate an n dimensional product feature vector where n is a number of features (or attributes) of a given product. A product feature vector may be used to determine one or more products that sufficiently align with attributes and/or current interest(s) of a viewer by comparing the product feature vector(s) to the viewer feature vector. A diagrammatic representation of a viewer and a diagrammatic representation of some products is shown in FIG. 7 and discussed below with reference to the same.

The website analyzer 508 may analyze website data. Analyzing website data may include extracting, parsing, or otherwise processing data pertaining to a website to determine features, characteristics, and/or attributes of a website. Website data may include, but is not limited to, data that may appear on a website (e.g., such as text, images, videos, etc.), the structure of that data on the website (e.g., how content of the website is organized) including relationships (e.g., the order of the words), and data relating to the appearance of the website (e.g., such as color schemes, fonts, layout, etc.).

The analyzer 500, and particularly a website analyzer 506, may analyze website data to generate a representation of a given website, and more specifically a representation of features, characteristics, and/or attributes of the given website. The representation may be a data structure or mathematical model that may be compared to similarly structured data structures or mathematical models. For example, in one embodiment, the analyzer 500 may generate a website feature vector. For example, the product analyzer 506 may generate an n dimensional website feature vector where n is a number of features (or attributes) of a given website. A website feature vector may be used to generate viewer feature vectors.

The account analyzer 510 may analyze account data. Analyzing account data may include extracting, parsing, or otherwise processing data pertaining to an account. Account data may include data associated with an advertising account, such as an ad source organization, and includes, but is not limited to, advertising campaign budgets, budget thresholds, spend rates, price structure (e.g., cost per click (cpc), cost per impression (cpi)), maximum price per ad (e.g., a maximum price the ad source organization is willing to pay for an ad), campaign dates (e.g., start and end dates), and target demographics. Furthermore, account data may include information about the business such as a URL to the ad source organization website and/or other sources that may provide publicly accessible information generated by the ad source organization (e.g., Facebook page, Twitter feed, etc.) and/or publicly accessible information approved by the ad source organization.

The ad source analyzer 512 may analyze ad source data. Analyzing ad source data may include extracting, parsing, or otherwise processing data pertaining to an ad source organization. Ad source data may include, but is not limited to, data that may be publicly accessible information about the ad source organization. For example, the publicly accessible information may be information on a website (e.g., text, images, videos, etc.), the structure of that data on the website (e.g., how content of the website is organized) including relationships (e.g., the order of the words), and data relating to the appearance of the website (e.g., such as color schemes, fonts, layout, etc.). The publicly accessible information may also be available via another source, such as an RSS feed, a social media platform, and/or third-party sources.

The multiple specialty analyzers 502, 504, 506, 508, 510, 512, receive and analyze the various forms of data to prepare the data for use in generating custom ads.

Figure 6:
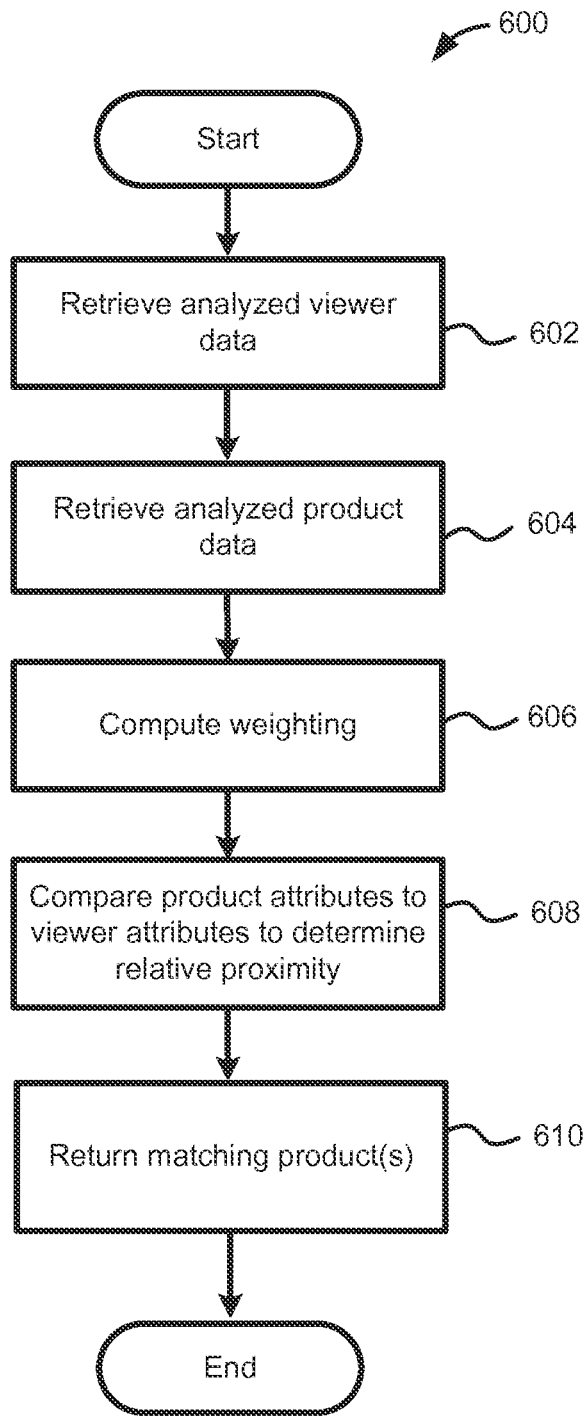
FIG. 6 is a flowchart of a process of identifying a matching product, according to one embodiment.

FIG. 6 is a flowchart of a process 600 of identifying a matching product, according to one embodiment. To identify a matching product, the process may compare analyzed viewer data to analyzed product data, optionally with consideration of a weighting, and identify a product that is closest in proximity to the viewer (e.g., a product with features, characteristics, and/or attributes that most closely align with features, characteristics, and/or attributes of the viewer). The process may retrieve 602 analyzed viewer data (e.g., from memory, from a viewer database, or the like) and may retrieve 604 analyzed product data (e.g., from memory, from a product database, or the like). The analyzed viewer data may have been analyzed in order to parse, filter, restructure, and/or otherwise put the viewer data in a form amendable to comparison with product data. Similarly, the analyzed product data may have been analyzed in order to parse, filter, restructure, and/or otherwise put the product data in a form amendable to comparison with viewer data. A weighting may be computed 606 based on the viewer data (e.g. to emphasize viewer features, characteristics, and/or attributes that may be of more significance in making a comparison to product data).

The analyzed product data, and especially product attributes, may be compared 608 to the analyzed viewer data, and especially the viewer attributes, to determine a relative closeness or proximity of the product to what the viewer might be interested in. The comparison may identify which one or more products of a plurality of products may be closer to, or more closely align with what a viewer may be interested in viewing. In other words, the comparison may identify which product(s) may have features, characteristics, and/or attributes that a viewer may be interested in and for which the viewer may be receptive of advertising.

As described above, in one embodiment, a viewer (e.g., viewer features, characteristics, and/or attributes) may be represented by a data structure, such as a viewer feature vector generated from viewer data and products (e.g., product features, characteristics, and/or attributes) may each be represented by a product feature vector generated from extracted product data. A weighting may be computed 606 based of the analyzed viewer data. The product feature vectors may be compared 608 to the viewer feature vector to determine which product feature vector most closely matches the viewer feature vector. The determination of relative closeness of a product feature vector to a viewer feature vector may include calculating a distance. The distance may be calculated using a distance formula, such as the $L_1$ norm (also known as the taxicab norm) as follows:

$$D = \sum_{i=1}^{n} |v_i - p_i|$$

where $\vec{v}$ is the viewer feature vector and $\vec{p}$ is the product feature vector. As another example, the distance may be calculated using a distance formula such as the $L_2$ norm (also known as the Euclidean norm) as follows:

$$D = \sqrt{\sum_{i=1}^{n} (v_i - p_i)^2}$$

again, where $\vec{v}$ is the viewer feature vector and $\vec{p}$ is the product feature vector.

As can be appreciated, other formulas for calculating distance and/or relative closeness may be appropriate and suitable for use in identifying matching products for a given viewer.

The process 600 may then return 610 one or more products that match (or closely or sufficiently align) with the viewer.

FIG. 7 provides a diagrammatic representation data structures that may represent analyzed viewer data and analyzed product data, according to one embodiment. In FIG. 7, representations of feature vectors are shown to illustrate identifying matching feature vectors. A viewer feature vector 702 may be generated by analyzing viewer data. The viewer feature vector 702 may be three-dimensional to represent three features, characteristics, and/or attributes of a viewer, and thus may be illustrated as a simplistic three-dimensional vector. Similar to the example scenario of FIGS. 3A-3C, the viewer feature vector may include a car type feature (e.g., represented along a y-axis of the representation of the viewer feature vector 702), a mileage feature (e.g., represented along a x-axis of the representation of the viewer feature vector 702), and a color feature (e.g., represented along a z-axis of the representation of the viewer feature vector 702). In FIG. 7, the point 704 of the viewer feature vector may be positioned on a three-dimensional grid representing the viewer feature vector 702. For example the point 704 may represent viewer features pertinent to an automobile including that the viewer may have an interest in a truck, with low mileage between 5,000 and 10,000 miles, and a color white.

Similarly, the product feature vectors 710, 720, 730, for three products (product 1, product 2, and product 3) may be three-dimensional to represent three features, characteristics, and/or attributes of the products (e.g., automobiles), and thus may also be illustrated as a simplistic three-dimensional vector. In order to be amenable to comparison with the viewer feature vector 702, the product feature vectors 710, 720, 730 may include a car type feature (e.g., represented along a y-axis of the representation of the product feature vectors 710, 720, 730), a mileage feature (e.g., represented along a x-axis of the representation of the product feature vectors 710, 720, 730), and a color feature (e.g., represented along a z-axis of the representation of the product feature vectors 710, 720, 730). In each of the product feature vectors 710, 720, 730 of FIG. 7, a point 712, 722, 732 of the viewer feature vector may be positioned on a three-dimensional grid representing the product feature vectors 710, 720, 730. For example the point 712 may represent product features of the first product, which may be a white truck having 8,000 miles. As can be seen, by the representation the first product feature vector 710 and the representation of the viewer feature vector 702, the features, characteristics, and/or attributes of product 1 fairly closely align with the features, characteristics, and/or attributes of the viewer. A calculation of the distance between these feature vectors could be compared to a calculation of the distance between the viewer feature vector and other product feature vectors to identify which product(s) most closely align with the viewer (e.g., which product(s) have features, characteristics, and/or attributes that most closely align with the features, characteristics, and/or attributes of the viewer).

As can be appreciated, any number of features, characteristics, and/or attributes may be represented by a feature vector such that the feature vectors could be n-dimensional where n is the number of features, characteristics, and/or attributes represented by a feature vector.

Figure 8:
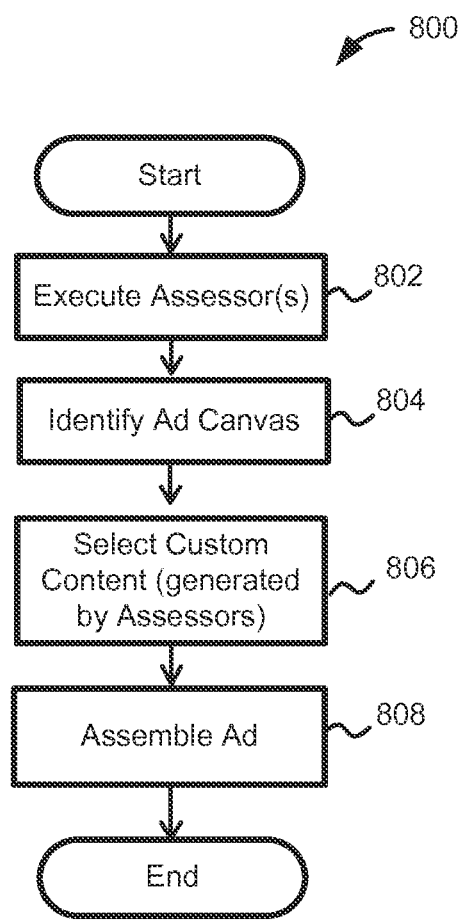
FIG. 8 is a flowchart for a process of generating a customized ad, according to one embodiment.

FIG. 8 is a flowchart for a process 800 of generating a customized ad, according to one embodiment. The customized ad is generated to effectively advertise a matching product to a given viewer. The matching product may be a product, for example, as determined by the process 600 of FIG. 6, as described above. The process 800 may begin by executing 802 one or more assessors, which may assess the analyzed viewer data, identify one or more current interests of a viewer, and generate customized ad content from the analyzed product data that aligns with the identified current interests of the viewer. Described differently, the assessors may generate custom content from extracted product data for the product to be advertised, based on identified viewer interests. A process of an assessor is described in greater detail below with reference to FIG. 9.

The process 800 may include identifying 804 an ad canvas, which may have been created previously or in real time. The ad canvas may be identified 804 based on information in the server request (e.g., website data), ad specifications (e.g., as specified by the ad source organization), one or more templates (e.g., specified by the display website or specified by ad source organization), the identified product (including associated product data), and other factors. Furthermore, the ad canvas may be identified 802 based on the color scheme, font sizes, and layout of the display website where the ad will be displayed in order to select an ad canvas with optimal features such as color and font for maximum effectiveness.

A selection 806 custom content generated by assessors may occur to select more relevant, pertinent, and/or interesting content for the viewer. The number of assessor executed may result in custom generated content that exceeds the size of the identified ad canvas or that may otherwise clutter a custom ad and thereby decrease effectiveness. The custom content generated by the assessors may be selected 806 based on size of the ad canvas and a weighting. The weighting may be determined based on viewer features, characteristics, attributes, and current interests. A custom ad may be assembled 808 by calculating the placement of the selected custom content generated by the assessors and based on other required or optional details such as the font size of text or the size of an image.

Figure 9:
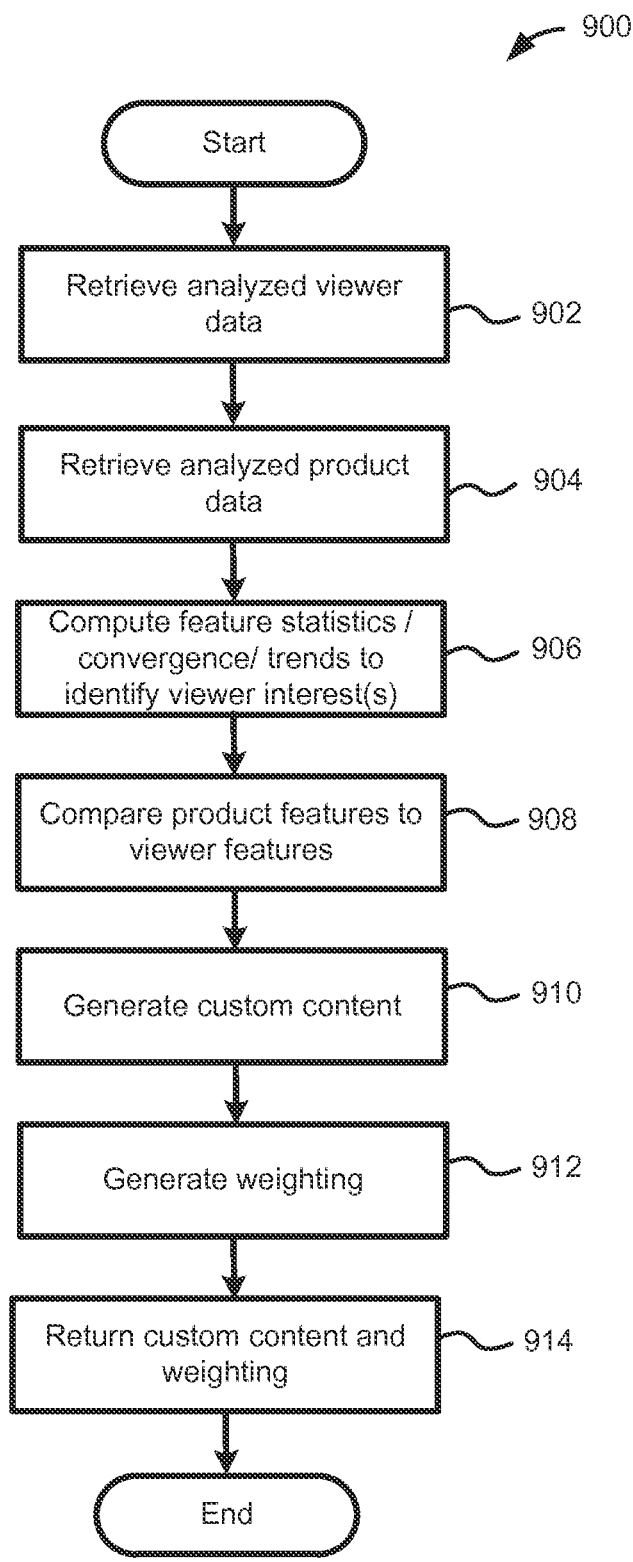
FIG. 9 is a flowchart for a process of an assessor, according to one embodiment.

FIG. 9 is a flowchart for a process 900 of an assessor, according to one embodiment. The process 900 may begin by retrieving 902 analyzed viewer data and retrieving 904 analyzed product data for the matching product to be advertised. Various mathematical and statistical measures may be computed 906 using the analyzed viewer data to identify current interests of the viewer. The computations 906 may include, but are not limited to, standard deviation, mean, maximum and minimum values, slope, and inflection points. The computations 906 may generate statistics and identify convergence of features and/or trends to identify current interests of the viewer. Some of these calculations may have been performed previously, in which case the result values may be retrieved instead of being recomputed. An example of convergence may be if the viewer has loaded multiple product images that have the same color. An example of a trend may be if the viewer has loaded multiple products where the price of the product is increasing. The process may then compare 908 the feature vectors associated with the viewer with the product feature vector. This comparison may include comparing individual features such as the price and/or may include comparing several features such as brand names where each brand is represented as one feature. The viewer features which exhibit convergence or trends may be weighted more heavily in the comparison. Similarly, features that do not converge or exhibit trends may be weighted less. The process may then generate 910 custom content and generate 912 a weighting based the computing 906 and comparing 908. Because the assessors have knowledge of (e.g., consider data of) the product(s) an ad source organization offers as well as knowledge of (e.g., consider data of) the interest(s) of a viewer, the custom content can be generated to contain information specific to the viewer that may be designed to highlight features, characteristics, and/or attributes of the product that may be of greater interest to the viewer or may use interests to convert or generate interest in the advertised product. The media and weight may then be returned 914 for use in custom ad generation, such as in the process 800 of FIG. 8, as described above.

As an example of functionality of an assessor, the matching product that may be identified may be slightly outside of a price range in which a viewer is most interested. The matching product may be a truck that is $24,990, and the viewer has been primarily browsing trucks that are under $20,000. The assessors may have determined that price is a current interest of the viewer or otherwise significant in the websites and/or product listings that the viewer may be viewing. With understanding of the current viewer interest, and that the product price is not as well matched as may be desired, the assessor process may generate custom content indicating "On sale" to appeal to the current interest of the viewer in price and attract the customer to view the custom advertisement and click through to learn more about the product.

Figure 10:
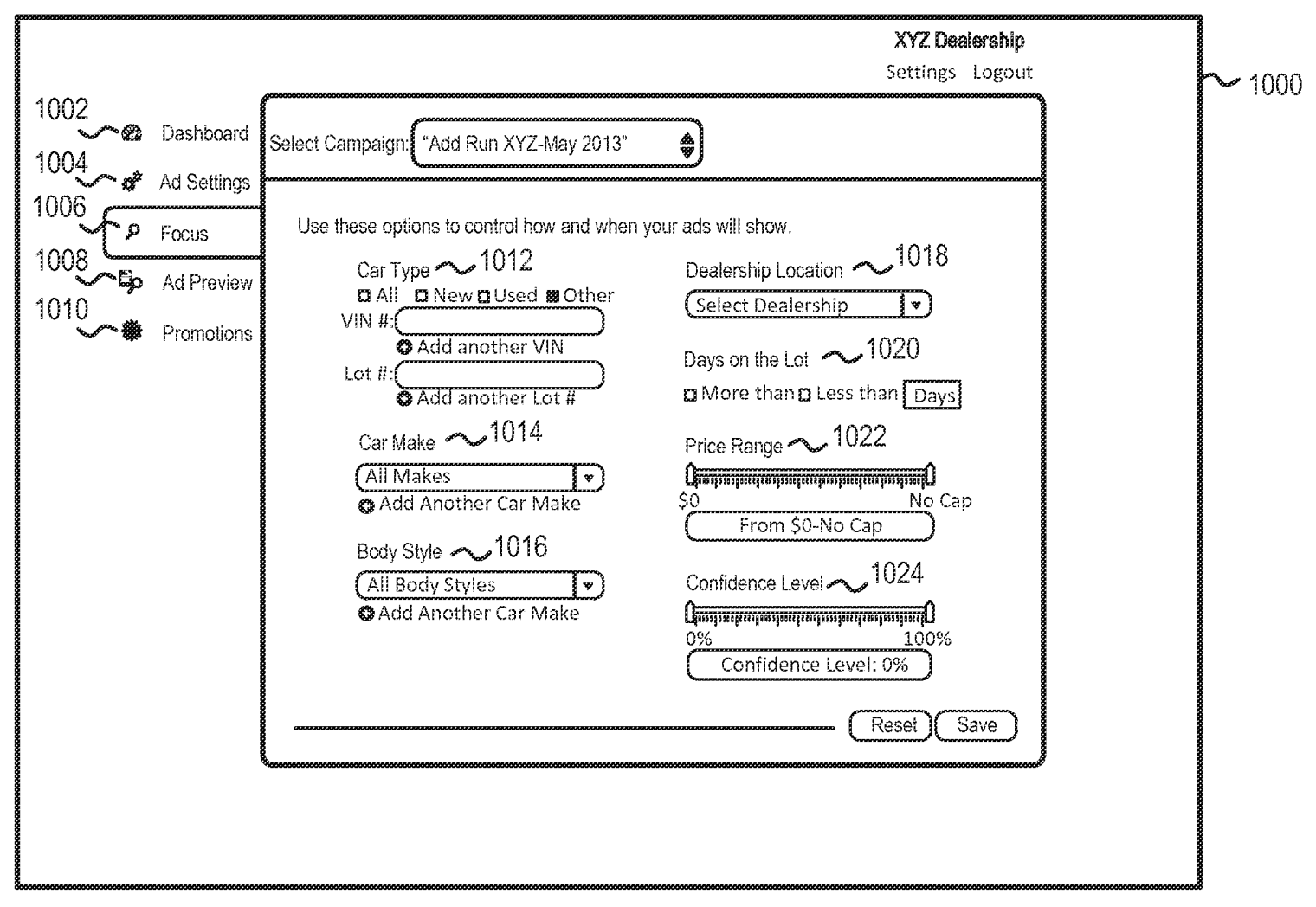

FIG. 10 is an interface 1000 for an ad source organization to manage generation of customized ads for products, according to one embodiment. The interface 1000 may enable configuration of parameters, setting of preferences, and the like to manage the content that is included in the customized advertisements and which products are advertised. The interface 1000 may include several individual interfaces (or pages), which may include an account overview page 1002 (referred to as "Dashboard" in FIG. 10), an advertisement settings page 1004 (referred to as "Ad Settings" in FIG. 10), a content focus page 1006 (referred to as "Focus" in FIG. 10), an advertisement preview page 1008 (referred to as "Ad Preview" in FIG. 10), and a promotions page 1010 (referred to as "Promotions" in FIG. 10). The account overview page 1002 may include advertisement account and campaign information such as impressions served, campaign costs, and other information. The advertisement settings page 1004 may include advertisement settings such as campaign duration, spending limits, website domains where ads should or should not be shown, etc. The content focus page 1006 may include features that allow the ad source organization to control criteria specifying what products are advertised. These criteria may be general in nature such as whether the condition of the product is new or used and/or they may be more specific such as the make of an automobile or the size of screen on a laptop computer. Other examples of criteria may include, but are not limited to color, price, days in inventory, material, geometric size, etc. Additionally, the focus page may include a confidence setting or filter. This may allow the ad source organization to only show ads to viewers that have the associated level of probability of engaging with the ad. The advertisement preview page and promotions page are discussed in detail in FIG. 9 and FIG. 10 respectively.

The interface 1000 of FIG. 10 is shown presenting a content focus page 1006. The content focus page provides one or more input controls to enable an ad source organization to configure settings (or criteria) to control the content that is included in the customized advertisements, presentation of the content, and/or which products are advertised. In the illustrated embodiment, the input controls may include, but are not limited to a "Car Type" input control 1012, a "Car Make" input control 1014, a "Body Style" input control 1016, a "Dealership Location" input control 1018, a "Days on the Lot" input control 1020, a "Price Range" input control 1022, and a "Confidence Level" input control 1024.

The "Car Type" input control 1012 may allow the ad source organization to control whether "New" and/or "Used" automobiles are advertised. Furthermore, the ad source organization may select "Other" to only advertise specific automobiles.

The "Car Make" input control 1014 may allow the ad source organization to control which automobile manufacturers are advertised. The ad source organization may select a single manufacture, multiple manufacturers, or all the automobile manufactures to designate that products in their inventory that were manufacture by the indicated manufacturers may be included in customized advertisements. Examples of automobile manufacture may include, but are not limited to, Ford, Honda, and Toyota.

The "Body Style" input control 1016 may allow the ad source organization to control which automobile body styles are advertised. The ad source organization may select a single body style, multiple body styles, or all the body styles in their inventory. Examples of automobile body styles may include, but are not limited to, compact, crossover, and truck.

The "Dealership Location" input control 1018 may allow the ad source organization to control whether products from a given location are advertised. The ad source organization may select a single location, multiple locations, or all the dealership locations.

The "Days on the Lot" input control 1020 may allow the ad source organization to control which automobiles are advertised based on the number of days a given automobile has been on the "Dealership Lot". Since the present disclosure may automatically extract product information and may check for updates, the system can gather knowledge of what products are in inventory and how long a given product has been in inventory. Furthermore, it may be desirous for the ad source organization to focus advertising efforts on products that have been in inventory for a longer amount of time because, for example, these products may use financial resources that cannot be leveraged for other purposes until the product is sold.

The "Price Range" input control 1022 may allow the ad source organization to control the price range of automobiles that are advertised. This may be desirous for the ad source organization to focus advertising resources on higher priced items where more profit may be generated.

The "Confidence Level" input control 1024 may allow the ad source organization to control which viewers may be shown advertisements based on a confidence score (or measure). As discussed above, the confidence measure may determine the likelihood of success and may be determined using several factors including how well the product meets the interest(s) of the viewer. For example, if a product has the same features that a viewer is interested in, the confidence measure may be high. Therefore, if the "Confidence Level" input control 1024 is set towards the high end of the confidence scale, customized ads for a given product may be generated only for viewers that already show interest in the given product and are the most likely to lead to the desired action, such as a sale. An example may be an ad source organization that sells Ford® trucks setting a high confidence level on the "Confidence Level" input control 1024 to ensure that customized ads for its products (Ford trucks) are generated for viewers who are likely looking for a Ford truck. A high confidence level setting may limit the broadness or reach of an advertising campaign. For example, ads may not be shown to viewers looking for a Dodge® truck.

If the "Confidence Level" input control 1024 is set at a moderate level, more towards the middle of the confidence scale, ads may be shown to viewers that show at least some interest in aspects of the product. A more moderate (toward the middle) confidence level setting may allow ads to be shown to viewers who initially may not have led to the desired action, but may be more easily converted into completing the desired action. For example, ads may be shown to viewers who are looking for Dodge trucks when the ad source organization may sell Ford Trucks.

If the "Confidence Level" input control 1024 is set toward the lower region of the confidence scale, ads may be shown to viewers that may have less interest in a given product. For example, customized ads of Ford truck may be generated to be shown to a viewer who may be primarily interested in a compact car or some other product.

Referring again to FIG. 10, the input controls given on the content focus page 1006 of the interface 1000 may be used in combination to allow the ad source organization to advertise any product or group of products. For example, an ad source organization may want to only advertise New Trucks that have been on the lot of Location A for more than 20 days. The input controls of "Car Type", "Body Style", "Dealership Location", and "Days on the Lot" may be used to obtain this group of automobiles. As another example, an ad source organization may want to only advertise BMW Vehicles (New and Used) that have a price over $25,000 to viewers that are interested in higher price BMW Vehicles. The input controls of "Car Type", "Car Make", "Price Range", and "Confidence Level" may be used to obtain this group of automobiles.

Figure 11:
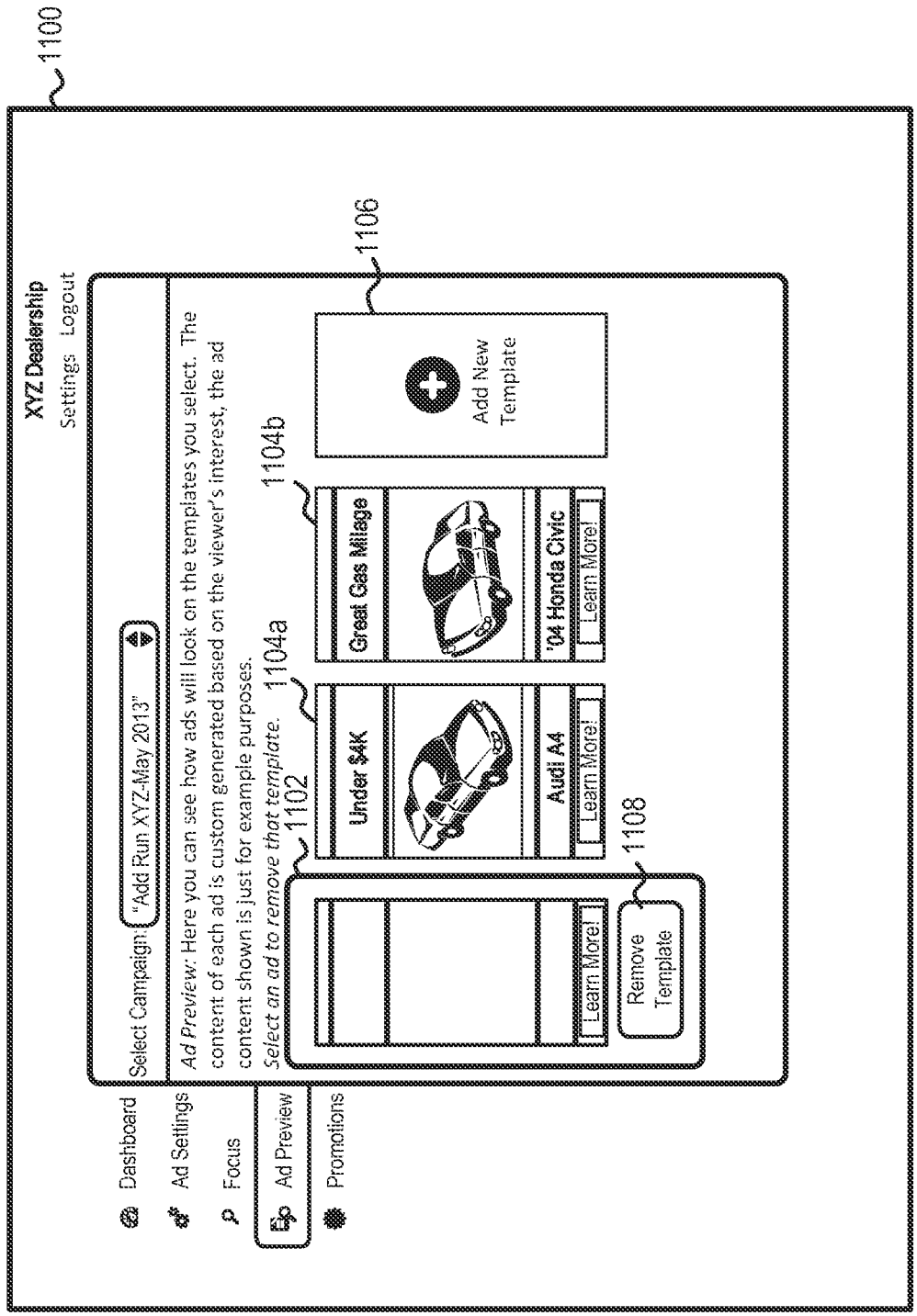
FIG. 11 is an interface for an ad source organization to preview advertisements, according to one embodiment.

FIG. 11 is an advertisement preview interface 1100, according to one embodiment. The preview interface 1100, may be preview page 1008 of the interface 1000 of FIG. 10 described above. The preview interface 1100 may provide functionality to enable an ad source organization to preview customized advertisements and how they may appear to a viewer that is presented the customized ads via the Internet. Since the present disclosure provides systems and methods for automatically generating customized ads based on a viewer, which may be done in real time, the ad source organization cannot preview them in the same manner they would preview static ads. The advertisement preview page 1100 may allow the ad source organization to preview potentially static components, such as an ad background 1102. The advertisement preview page may provide examples of ads 1104a, 1104b, by including superimposed potential permutations of dynamic features such as text and images in order to provide the ad source organization with the ability to preview how customized ads may look, before customized ads are generated and presented to a viewer. For example, in FIG. 11, the preview interface 1100 presents two examples 1104a, 1104b of ads for cars. The advertisement preview page may allow an ad source organization to add 1106 new templates, edit existing templates such as by adding components or remove existing components, and remove 1108 existing templates.

Figure 12:
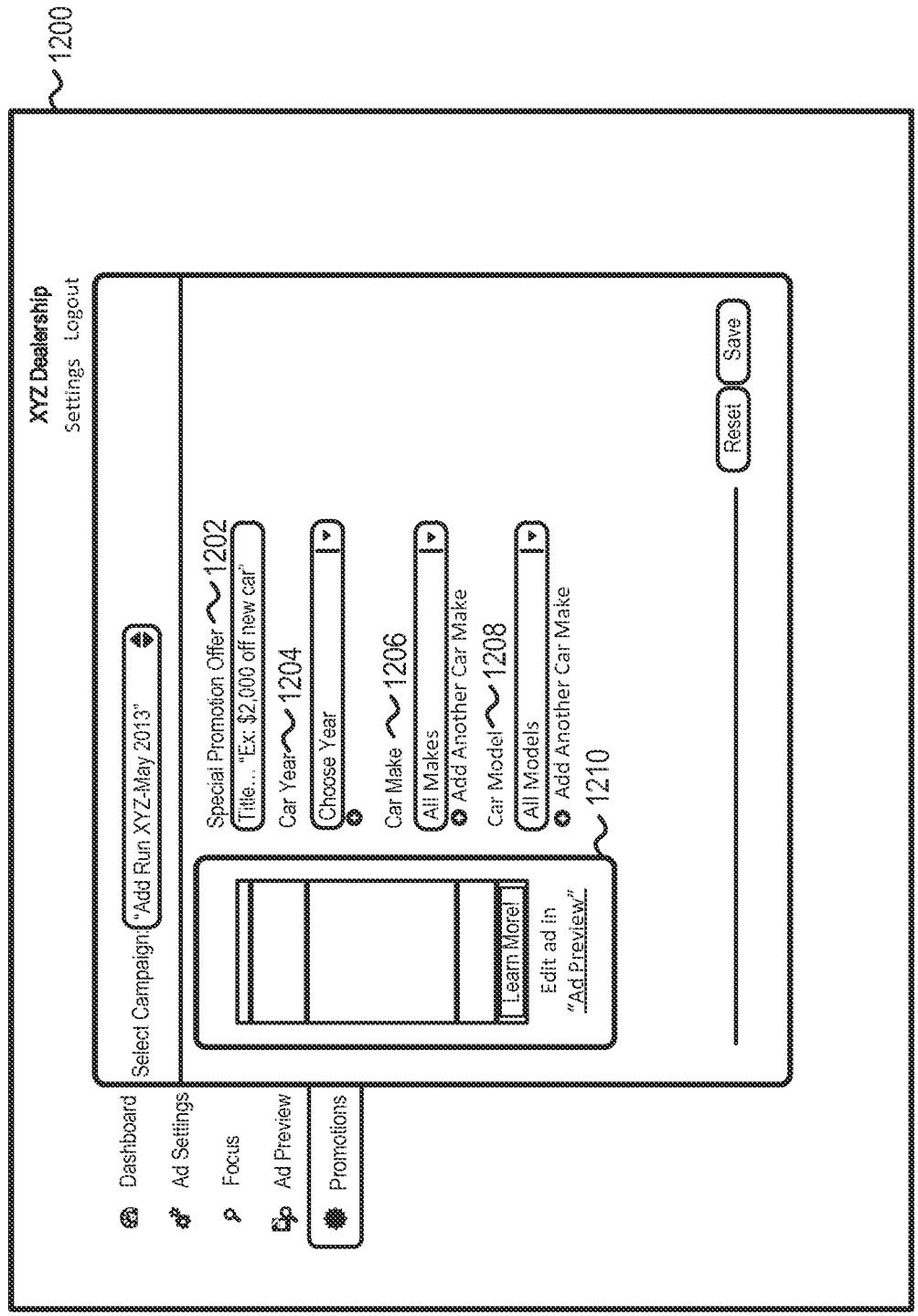
FIG. 12 is an interface for an ad source organization to modify an ad campaign.

FIG. 12 is a promotions interface 1200 for an ad source organization to add promotions or other information to the system and associate it with a given product. Since the present disclosure provides systems and methods for automatically generating customized ads, which may include automatically extracting information for the ad source organization website, the promotions page 1200 allows the ad source organization to add additional information that may not be included in other publicly available electronic data generated by the ad source organization, such as sale offers and discounts. The promotions page 1200 may include promotion input controls 1202 to allow an ad source organization to input the promotion (referred to as "Special Promotion Offer" in FIG. 12). The promotion page 1200 may also include additional input controls to associate a promotion with a product. An example may include if the ad source organization is an automotive dealer, there may be input controls such as the car year 1204, car make 1206, and car model 1208. The promotions page may provide a promotion preview 1210 to show an example of the promotional offer superimposed on an ad background. The promotions page 1200 may also include formatting options (not shown in FIG. 12) that may designate a color of text, a relative location (i.e. top of the ad, bottom of the ad, etc.), etc. of the promotion content when included in an automatically generated customized ad.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art appreciates that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

As will be appreciated those having skill in the art, many changes may be made to the details of the above-described embodiments without departing from the underlying principles of the disclosure. The scope of the present invention should, therefore, be determined only by the following claims.

What is claimed is:

1. A system for automatically generating customized advertisements, the system comprising:
   one or more processors;
   a system memory in electrical communication with the one or more processor to store product data;
   a network interface in electrical communication with the one or more processors to electronically couple the system to a network that is in electronic communication with a source of publicly accessible electronic information generated by an ad source organization and with a request computing device that presents a display website that requests advertisements, wherein the display website is served by a server that is distinct from the source of publicly accessible electronic information;
   an extractor to, by the one or more processors, automatically extract, from the source of publicly accessible electronic information, product data for one or more products offered by an ad source organization, the extractor further configured to store the extracted product data in the system memory;
   an analyzer to, by the one or more processors, automatically process extracted product data and process viewer data for comparison, the extracted product data processed to determine product features of the one or more products offered by the ad source organization, the viewer data derived by the analyzer from interactions of a viewer with one or more advertisement display websites, wherein the viewer data is processed to determine one or more viewer features of the viewer, wherein the viewer is to whom a customized advertisement generated by the system is to be presented, the one or more viewer features including an inferred viewer feature from viewer data other than terms of a search query;

a match engine to, upon receipt of an advertisement request, compare the product features to the one or more viewer features, including the inferred viewer feature, to identify a product of the one or more products that aligns with the one or more viewer features;

a custom ad generator to generate a customized advertisement of the product specifically for the viewer based on the one or more viewer features and the product features, the custom advertisement including at least a portion of the extracted product data that aligns with the inferred viewer feature; and a communication interface to communicate the customized advertisement of the product to the request computing device that requests the advertisement for presentation on the display website.

2. The system of claim 1, further comprising a product updater to identify and extract changed product data generated by the ad source organization, wherein the custom ad generator generates a second customized advertisement including the changed product data.

3. The system of claim 2, wherein the changed product data comprises an update to pricing for the product.

4. The system of claim 2, wherein the changed product data comprises product information for a different product offered by the ad source organization.

5. The system of claim 1, wherein the publicly accessible electronic data generated by the ad source organization comprises a website available via the Internet.

6. The system of claim 1, wherein the extractor is configured to extract, from publicly accessible electronic information, product data that includes product specification information.

7. The system of claim 1, wherein the extractor is configured to extract, from publicly accessible electronic information, ad source organization data other than product data from the publicly accessible electronic data generated by the ad source organization, wherein generating a customized advertisement includes using at least a portion of the ad source organization data.

8. The system of claim 1, wherein the at least a portion of the extracted product data included in the custom advertisement by the custom ad generator is determined based on a current interest of the viewer that is computed using the one or more viewer features.

9. A computer-implemented method to automatically generate customized advertisements, the method comprising:

receiving at a computing device a request for an advertisement;

receiving at the computing device viewer data of a viewer to whom a customized advertisement is to be presented, the viewer data derived from interactions of the viewer with one or more advertisement display websites;

analyzing the viewer data to determine one or more viewer features of the viewer, the one or more viewer features including an inferred viewer feature from viewer data other than terms of a search query;

extracting, from a source of publicly accessible electronic information, product data of a product offered by an ad source organization;

analyzing the extracted product data to determine one or more product features of the product;

comparing the one or more viewer features to the one or more product features to determine whether the one or more product features align with the one or more viewer features;

if the one or more product features align with the one or more viewer features, generating a customized advertisement specifically for the viewer using at least a portion of the extracted product data that aligns with the inferred viewer feature; and returning the customized advertisement for the product to a device that provided the request for an advertisement.

10. The method of claim 9, further comprising:

identifying changed publicly accessible information for the product offered by the ad source organization;

extracting changed product data;

generating a second customized advertisement including the changed product data.

11. The method of claim 10, wherein the changed product data comprises an update to the product data for the product offered by the ad source organization.

12. The method of claim 11, wherein the update to the product data comprises an update to pricing information for the product.

13. The method of claim 11, wherein the changed product data comprises product information for a different product offered by the ad source organization.

14. The method of claim 10, wherein identifying changed product data comprises:

extracting, from publicly accessible electronic information, updated product data for the product offered by the ad source organization;

comparing the updated product data to previously extracted product data to identify a change.

15. The method of claim 10, wherein identifying changed product data comprises:

identifying, from publicly accessible electronic information, a notification of a change to product data previously generated by the ad source organization.

16. The method of claim 9, wherein the publicly accessible electronic data generated by the ad source organization comprises a website available via the Internet.

17. The method of claim 9, wherein the product data that is extracted includes product specification information.

18. The method of claim 9, further comprising:

extracting ad source organization data other than product data from the publicly accessible electronic data generated by the ad source organization, wherein generating a customized advertisement includes using at least a portion of the ad source organization data.

19. The method of claim 9, further comprising:

identifying a current interest of the viewer using the one or more viewer features;

wherein the at least a portion of the extracted product data used to generate the custom ad is determined based on the identified current interest of the viewer.

20. A computer-implemented method to automatically generate customized advertisements, the method comprising:

receiving at a computing device a request for an advertisement;

receiving at the computing device viewer data of a viewer to whom a customized advertisement is to be presented, the viewer data derived from interactions of the viewer with one or more advertisement display websites;

analyzing the viewer data to determine one or more viewer features of the viewer, the one or more viewer features including an inferred viewer feature from viewer data other than terms of a search query;

extracting, from a source of publicly accessible electronic data generated by an ad source organization, product data of a plurality of products offered by the ad source organization;

processing the extracted product data to determine one or more product features of each of the plurality of products;

comparing the one or more viewer features to the one or more product features to determine which product of the plurality of products has product features that align with the current interests of the viewer to select a product to be advertised;

generating a customized advertisement specifically for the viewer using at least a portion of the extracted product data for the product to be advertised and that aligns with the inferred viewer feature; and returning the customized advertisement of the product to be advertised to a device that provided the request for the ad.

* * * * *